(12) United States Patent
Kubota et al.

(10) Patent No.: US 10,473,891 B2
(45) Date of Patent: Nov. 12, 2019

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Tomohiro Yonezawa, Tochigi (JP)

(73) Assignee: KANTATSU CO., LTD., Tokyo (JP)

( * ) Notice: Subject to any disclaimer, the term of this patent is extended or adjusted under 35 U.S.C. 154(b) by 0 days.

(21) Appl. No.: 15/925,936

(22) Filed: Mar. 20, 2018

(65) Prior Publication Data

US 2018/0210168 A1 Jul. 26, 2018

Related U.S. Application Data

(63) Continuation of application No. 15/260,399, filed on Sep. 9, 2016, now Pat. No. 10,067,313, which is a (Continued)

(30) Foreign Application Priority Data

Apr. 15, 2014 (JP) ................................ 2014-083530

(51) Int. Cl.
*G02B 9/12* (2006.01)
*G02B 9/64* (2006.01)
(Continued)

(52) U.S. Cl.
CPC ............... *G02B 9/12* (2013.01); *G02B 5/005* (2013.01); *G02B 9/64* (2013.01); *G02B 13/0045* (2013.01); *G02B 13/18* (2013.01); *G02B 27/0025* (2013.01)

(58) Field of Classification Search
None
See application file for complete search history.

(56) References Cited

U.S. PATENT DOCUMENTS 4,176,914 A * 12/1979 Fujibayashi ........... G02B 13/04
359/755
5,831,775 A * 11/1998 Matsui ..................... G02B 9/12
359/745
(Continued)

FOREIGN PATENT DOCUMENTS

EP 2860564 A1 4/2015
JP 2006-154481 A 6/2006
(Continued)

*Primary Examiner* — Darryl J Collins
(74) *Attorney, Agent, or Firm* — Kubotera & Associates, LLC

(57) ABSTRACT

An imaging lens includes a first lens group; a second lens group; and a third lens group, arranged in this order from an object side. The first lens group includes a first lens having positive refractive power, a second lens, and a third lens with a space in between. The second lens group includes a fourth lens having negative refractive power and a fifth lens with a space in between. The third lens group includes a sixth lens having negative refractive power and a seventh lens with a space in between. A surface of the second lens on the object side has a positive curvature radius. A surface of each of the third lens and the sixth lens on the image plane side has a positive curvature radius. A surface of the fourth lens on the object side has a negative curvature radius. The first lens has a specific Abbe's number.

20 Claims, 18 Drawing Sheets

Related U.S. Application Data continuation of application No. PCT/JP2015/060481, filed on Apr. 2, 2015.

(51) Int. Cl.
  *G02B 11/34* (2006.01)
  *G02B 13/18* (2006.01)
  *G02B 13/00* (2006.01)
  *G02B 5/00* (2006.01)
  *G02B 27/00* (2006.01)

(56) References Cited

U.S. PATENT DOCUMENTS

| | | |
|---|---|---|
| 6,078,432 A | 6/2000 | Toyama |
| 2012/0229692 A1 | 9/2012 | Matsumura |
| 2012/0229693 A1 | 9/2012 | Matsumura |
| 2013/0050846 A1 | 2/2013 | Huang |
| 2014/0009843 A1 | 1/2014 | Tsai et al. |
| 2014/0043694 A1 | 2/2014 | Tsai et al. |
| 2014/0160580 A1 | 6/2014 | Nishihata et al. |
| 2014/0211324 A1 | 7/2014 | Ishizaka |
| 2015/0070783 A1 | 3/2015 | Hashimoto |
| 2015/0103414 A1 | 4/2015 | Baik |
| 2015/0247990 A1 | 9/2015 | Kubota et al. |
| 2015/0268448 A1 | 9/2015 | Kubota et al. |
| 2015/0293327 A1 | 10/2015 | Tomioka |

FOREIGN PATENT DOCUMENTS

| | | |
|---|---|---|
| JP | 2010-176018 A | 8/2010 |
| JP | 2012-155223 A | 8/2012 |
| JP | 2012-220654 A | 11/2012 |
| JP | 2014-115456 A | 6/2014 |
| JP | 2014-145961 A | 8/2014 |
| JP | 2015-55728 A | 3/2015 |

* cited by examiner

IMAGING LENS

CROSS-REFERENCE TO RELATED APPLICATIONS

This is a continuation application of a prior application Ser. No. 15/260,399, filed on Sep. 9, 2016, pending, which claims priority of Japanese Patent Application No. 2014-083530, filed on Apr. 15, 2014.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a cellular phone, a portable information terminal, or the like, a digital still camera, a security camera, a vehicle onboard camera, and a network camera.

In these years, in place of cellular phones that are intended mainly for making phone calls, so-called "smartphones", i.e., multifunctional cellular phones which can run various application software as well as a voice call function, have been more widely used. When application software is run on smartphones, it is possible to perform functions such as those of digital still cameras and car navigation systems on the smartphones. In order to perform those various functions, most models of smartphones include cameras similar to the cellular phones.

Generally speaking, product groups of such smartphones are often composed according to specifications for beginners to advanced users. Among them, an imaging lens to be mounted in a product designed for the advanced users is required to have a high-resolution lens configuration so as to be also applicable to a high pixel count imaging element of these years.

As one of methods of attaining the high-resolution imaging lens, there has been a method of increasing the number of lenses that compose the imaging lens. However, the increase of the number of lenses easily causes an increase in the size of the imaging lens. Therefore, the lens configuration having a large number of lenses has a disadvantage in terms of mounting in a small-sized camera such as the above-described smartphones. For this reason, conventional imaging lenses have been developed so as to reduce the number of lenses therein as much as possible. However, with rapid advancement in achieving the higher pixel count of an imaging element in these days, an imaging lens has been developed so as to attain higher resolution rather than a shorter total track length of the imaging lens. For example, while it has been conventionally common to mount a camera unit, which includes an imaging lens and an imaging element, inside a smartphone, in these years, there has also been an attempt to attach a separate camera unit onto a smartphone, whereby it is possible to obtain images equivalent to those of digital still cameras.

In case of a lens configuration composed of seven lenses, due to the large number of lenses of the imaging lens, although it is slightly disadvantageous for downsizing of the imaging lens, it has high flexibility in design. In addition, it has potential to attain satisfactory correction of aberrations, and downsizing of the imaging lens in a balanced manner. For example, as the imaging lens having the seven-lens configuration as described above, an imaging lens described in Patent Reference has been known.

Patent Reference: Japanese Patent Application Publication No. 2012-155223

The conventional imaging lens described in Patent Reference includes a first lens that has a shape of a biconvex shape, a second lens that has a shape of a biconcave shape joined to the first lens, a third lens that is negative and has a shape of a meniscus lens directing a convex surface thereof to the object side, a fourth lens that is positive and has a shape of a meniscus lens directing a concave surface thereof to the object side, a fifth lens that is negative and directs a convex surface thereof to the object side, a sixth lens that has a biconvex shape, and a seventh lens that has a biconcave shape, arranged in the order from the object side. According to the conventional imaging lens of Patent Reference, the first through the fourth lenses compose a first lens group and the fifth through the seventh lenses compose a second lens group. With the configuration, it is designed to restrain a ratio of a focal length of the first lens group relative to that of the second lens group within a certain range, so that it is achievable to downsize the imaging lens and satisfactorily correct aberrations.

In case of the conventional imaging lens of Patent Reference, although the size of the imaging lens is small, correction of the image surface is insufficient and the distortion is especially large. Therefore, there is a limit by itself to achieve a high performance imaging lens. With the lens configuration of the imaging lens of Patent Reference, it is difficult to achieve satisfactory aberration correction while downsizing of the imaging lens.

It should be noted that such a problem is not specific to the imaging lens to be mounted in cellular phones and smartphones. Rather, it is a common problem for an imaging lens to be mounted in a relatively small camera such as digital still cameras, portable information terminals, security cameras, vehicle onboard cameras, and network cameras.

In view of the above-described problems of the conventional techniques, an object of the present invention is to provide an imaging lens that can attain both downsizing thereof and satisfactory aberration correction.

Further objects and advantages of the present invention will be apparent from the following description of the invention.

SUMMARY OF THE INVENTION

In order to attain the objects described above, according to a first aspect of the present invention, an imaging lens includes a first lens group having positive refractive power; a second lens group having positive refractive power, and a third lens group having negative refractive power, arranged in the order from an object side to an image plane side. The first lens group includes a first lens having positive refractive power, a second lens having positive refractive power, and a third lens having negative refractive power. The second lens group includes a fourth lens and a fifth lens. The third lens group includes a sixth lens having negative refractive power and a seventh lens having negative refractive power. According to the first aspect of the invention, when the first lens has Abbe's number $vd1$, the second lens has Abbe's number $vd2$, the third lens has Abbe's number $vd3$, the seventh lens has Abbe's number $vd7$, the first lens has a focal length $f1$, and the second lens has a focal length $f2$, the imaging lens of the invention satisfies the following conditional expressions (1) through (5):

$$40 < vd1 < 75 \quad (1)$$

$$40 < vd2 < 75 \quad (2)$$

$$20 < vd3 < 35 \qquad (3)$$

$$40 < vd7 < 75 \qquad (4)$$

$$2.5 < f1/f2 < 30 \qquad (5)$$

According to the first aspect of the invention, the imaging lens of the invention includes the first lens group having positive refractive power, the second lens group having positive refractive power similarly to the first lens group, and the third lens group having negative refractive power, arranged in the order from the object side. According to the first aspect of the invention, the arrangement of refractive powers of the respective lens groups is "positive-positive-negative" in the order from the object. Generally speaking, a chromatic aberration is corrected by arranging the lens group having positive refractive power and the lens group having negative refractive power in the order from the object side. In the lens configuration like this, in order to downsize the imaging lens, it is necessary to increase the refractive power of the positive lens group, which is disposed on the object side. However, the refractive power of the lens group having positive refractive power increases, it is often harder to satisfactorily correct the chromatic aberration.

According to the first aspect of the invention, in the imaging lens, the positive refractive power of the whole lens system is shared between the first lens group and the second lens group. For this reason, in comparison with when the number of lens groups having positive refractive power is one, it is achievable to relatively keep weak the refractive powers of the positive lenses that compose the respective lens groups. Therefore, according to the imaging lens of the invention, among the aberrations, especially the chromatic aberration is satisfactorily corrected, and thereby it is achievable to obtain satisfactory image-forming performance, which is necessary for high-resolution imaging lens. In addition, according to the imaging lens of the invention, since the third lens group has negative refractive power, it is achievable to suitably downsize the imaging lens.

The above-described first lens group is composed of three lenses, in which the arrangement of refractive powers thereof is positive-positive-negative. Those three lenses are respectively formed from lens materials that satisfy the conditional expressions (1) through (3). The first lens, the second lens, and the third lens are a combination of low-dispersion materials and a high-dispersion material. With such arrangement of refractive powers of the respective lenses and the arrangement of Abbe's numbers, in the first lens group, it is suitably restrain generation of chromatic aberration, and it is satisfactorily achieve correction of chromatic aberration, if any generated. Here, according to the imaging lens of the invention, the positive refractive power is shared between two lenses, i.e., the first lens and the second lens. Therefore, the respective refractive powers of the first lens and the second lens are kept relatively low. In addition, it is achievable to suitably downsize the imaging lens, while satisfactorily correcting the aberrations.

Moreover, as shown in the conditional expression (4), the seventh lens, which is disposed to be the closest to the image plane side in the imaging lens, is made of a low-dispersion material. Therefore, it is achievable to suitably restrain the chromatic aberration in the seventh lens, and in turn it is achievable to suitably restrain the chromatic aberration of the imaging lens.

When the imaging lens satisfies the conditional expression (5), it is achievable to suitably correct a coma aberration, astigmatism, and a distortion in a balanced manner, while downsizing the imaging lens. When the value exceeds the upper limit of "30", the refractive power of the second lens is strong relative to that of the first lens. Therefore, the back focal length is long, and it is easier to secure space to dispose an insert such as an infrared cut-off filter. However, since the first lens has relatively weak refractive power, it is disadvantageous for downsizing of the imaging lens. In addition, an inner coma aberration easily occurs for off-axis light fluxes and a minus distortion increases, so that it is difficult to obtain satisfactory image-forming performance. On the other hand, when the value is below the lower limit of "2.5", the first lens has strong refractive power relative to that of the second lens. Therefore, it is advantageous for downsizing of the imaging lens and satisfactory correction of the distortion. However, an outer coma aberration easily occurs for off-axis light fluxes and an astigmatic difference increases. Therefore, it is difficult to obtain satisfactory image-forming performance.

According to a second aspect of the invention, when the whole lens system has a focal length f, and a composite focal length of the first lens and the second lens is f12, the imaging lens having the above-described configuration preferably satisfies the following conditional expression (6):

$$0.5 < f12/f < 1.1 \qquad (6)$$

When the imaging lens satisfies the conditional expression (6), it is achievable to restrain the chromatic aberration, the astigmatism, the distortion, and the field curvature within preferred ranges. When the value exceeds the upper limit of "1.1", the first lens group has weak positive refractive power relative to the refractive power of the whole lens system. As a result, in the first lens group, the third lens has relatively strong negative refractive power. For this reason, in order to satisfactorily correct the aberrations, it is necessary to weaken the negative refractive power of the third lens. When third lens has weak negative refractive power, the axial chromatic aberration is insufficiently corrected (a focal position at a short wavelength moves to the object side relative to that at a reference wavelength) and the chromatic aberration of magnification for off-axis light fluxes at periphery of the image is insufficiently corrected (an image-forming point at a short wavelength moves in a direction to be close to the optical axis relative to that at a reference wavelength). Furthermore, since minus distortion increases, it is difficult to obtain satisfactory image-forming performance. On the other hand, when the value is below the lower limit of "0.5", it is easy to correct the distortion and the chromatic aberration, but it is difficult to secure a back focal length. Moreover, the astigmatic difference increases at off-axis light fluxes at periphery of the image, so that it is difficult to obtain satisfactory image-forming performance.

According to a third aspect of the invention, when the third lens has a focal length f3, the imaging lens having the above-described configuration preferably satisfies the following conditional expression (7):

$$-1.0 < f2/f3 < -0.2 \qquad (7)$$

When the imaging lens satisfies the conditional expression (7), it is achievable to satisfactorily correct the chromatic aberration, the distortion, and the field curvature. When the value exceeds the upper limit of "−0.2", the third lens has weak negative refractive power relative to the positive refractive power of the second lens. Therefore, the axial chromatic aberration is insufficiently corrected and the minus distortion increases. In addition, an image-forming surface curves towards the object side, i.e., the field curvature is insufficiently corrected. Therefore, it is difficult to obtain satisfactory image-forming performance. On the other hand, when the value is below the lower limit of "−1.0", although it is advantageous for correcting the distortion and the axial chromatic aberration, the image-forming surface curves towards the image plane side, i.e., the field curvature is excessively corrected. Therefore, also in this case, it is difficult to obtain satisfactory image-forming performance.

According to a fourth aspect of the invention, when the composite focal length of the first lens and the second lens is f12 and the third lens has a focal length f3, the imaging lens having the above-described configuration preferably satisfies the following conditional expression (8):

$$-1.0<f12/f3<-0.1 \qquad (8)$$

When the imaging lens satisfies the conditional expression (8), it is achievable to restrain the off-axis coma aberration, the chromatic aberration, and the astigmatism respectively within preferred ranges in balanced manner. When the value exceeds the upper limit of "−0.1", although it is advantageous for downsizing of the imaging lens, the axial chromatic aberration is insufficiently corrected and the astigmatic difference increases. In addition, an outer coma aberration easily occurs for the off-axis light fluxes, which is more difficult to correct. Therefore, it is difficult to obtain satisfactory image-forming performance. On the other hand, when the value is below the lower limit of "−1.0", it is advantageous for satisfactory correction of the axial chromatic aberration and for securing a back focal length. However, spherical aberration is insufficiently corrected and inner coma increases, so that it is difficult to obtain satisfactory image-forming performance.

According to a fifth aspect of the invention, when the whole lens system has a focal length f, and a composite focal length of the sixth lens and the seventh lens is f67, the imaging lens having the above-described configuration preferably satisfies the following conditional expression (9):

$$-1.5<f67/f<-0.5 \qquad (9)$$

When the imaging lens satisfies the conditional expression (9), it is achievable to satisfactorily correct astigmatism, while downsizing the imaging lens. In addition, when the imaging lens satisfies the conditional expression (9), it is also achievable to restrain an incident angle of a light beam emitted from the imaging lens to the image plane within the range of chief ray angle (CRA). As is well known, a so-called chief ray angle (CRA) is set in advance for an imaging element, i.e. a range of an incident angle of a light beam that can be taken in the sensor, for an imaging element such as a CCD sensor or a CMOS sensor. Restraining the incident angle of a light beam emitted from the imaging lens to the image plane within the range of CRA, it is achievable to suitably restrain generation of shading, which is a phenomenon of obtaining a dark part on the periphery of the image.

When the value exceeds the upper limit of "−0.5" in the conditional expression (9), it is advantageous for downsizing the imaging lens. However, it is difficult to secure the back focal length. Moreover, in the astigmatism, the sagittal image surface tilts to the object side and the astigmatic difference increases. Therefore, it is difficult to obtain satisfactory image-forming performance. Moreover, it is difficult to restrain the incident angle of a light beam emitted from the imaging lens to the image plane within the range of CRA. On the other hand, when the value is below the lower limit of "−1.5", it is advantageous for restraining the incident angle within the range of CRA, but it is difficult to downsize the imaging lens. Moreover, the chromatic aberration of magnification is insufficiently corrected at periphery of the image, and a minus distortion increases. Therefore, it is difficult to obtain satisfactory image-forming performance.

According to a sixth aspect of the invention, when the composite focal length of the fourth lens and the fifth lens is f45 and a composite focal length of the sixth lens and the seventh lens is f67, the imaging lens having the above-described configuration preferably satisfies the following conditional expression (10):

$$-3<f45/f67<-0.8 \qquad (10)$$

When the imaging lens satisfies the conditional expression (10), it is achievable to satisfactorily correct a chromatic aberration of magnification, a distortion, and a field curvature, while restraining the incident angle of a light beam emitted from the imaging lens to the image plane within the range of CRA. When the value exceeds the upper limit of "−0.8", it is easy to restrain the incident angle of a light beam emitted from the imaging lens to the image plane within the range of CRA. However, the minus distortion increases. Moreover, a chromatic aberration of magnification is insufficiently corrected at periphery of the image, and the field curvature is insufficiently corrected. Therefore, it is difficult to obtain satisfactory image-forming performance. On the other hand, when the value is below the lower limit of "−3", it is advantageous for correction of the chromatic aberration of magnification and the distortion. However, the astigmatic difference increases, so that it is difficult to obtain satisfactory image-forming performance.

According to a seventh aspect of the invention, when the sixth lens has a focal length f6 and the seventh lens has a focal length f7, the imaging lens having the above-described configuration preferably satisfies the following conditional expression (11):

$$0.02<f7/f6<0.3 \qquad (11)$$

When the imaging lens satisfies the conditional expression (11), it is achievable to satisfactorily correct the distortion, the field curvature, and the chromatic aberration of magnification, while securing the back focal length. When the value exceeds the upper limit of upper limit of "0.3", it is advantageous for satisfactory correction of the chromatic aberration of magnification. However, it is difficult to secure a back focal length. In addition, the field curvature is insufficiently corrected and the minus distortion increases. Therefore, it is difficult to obtain satisfactory image-forming performance. On the other hand, when the value is below the lower limit of "0.02", it is easy to secure the back focal length. However, the chromatic aberration of magnification increases at periphery of the image. Therefore, also in this case, it is difficult to obtain satisfactory image-forming performance.

According to an eighth aspect of the invention, when the whole lens system has a focal length f and a distance along the optical axis between the third lens and the fourth lens is D34, the imaging lens having the above-described configuration preferably satisfies the following expression (12):

$$0.03<D34/f<0.2 \qquad (12)$$

When the imaging lens satisfies the conditional expression (12), it is achievable to restrain the distortion, the astigmatism, and the field curvature respectively within satisfactory ranges, while restraining the incident angle of a light beam emitted from the imaging lens to the image plane within the range of CRA. When the value exceed the upper limit of "0.2", it is easy to restrain the incident angle of a light beam emitted from the imaging lens to the image plane within the range of CRA, and it is also easy to correct the distortion. However, it is difficult to secure the back focal length. In addition, the field curvature is excessively corrected and the astigmatic difference also increases. Therefore, it is difficult to obtain satisfactory image-forming performance. On the other hand, when the value is below the lower limit of "0.03", it is easy to secure the back focal length, but it is difficult to restrain the incident angle of a light beam emitted from the imaging lens to the image plane within the range of CRA. Furthermore, since the minus distortion increases, it is difficult to obtain satisfactory image-forming performance.

According to the imaging lens of the present invention, it is possible to provide a small-sized imaging lens that is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, and 16 are schematic sectional views of the imaging lenses in Numerical Data Examples 1 to 6 according to the embodiment, respectively. Since the imaging lenses in those Numerical Data Examples have the same basic configuration, the lens configuration of the embodiment will be described with reference to the illustrative sectional view of Numerical Data Example 1.

Figure 1:
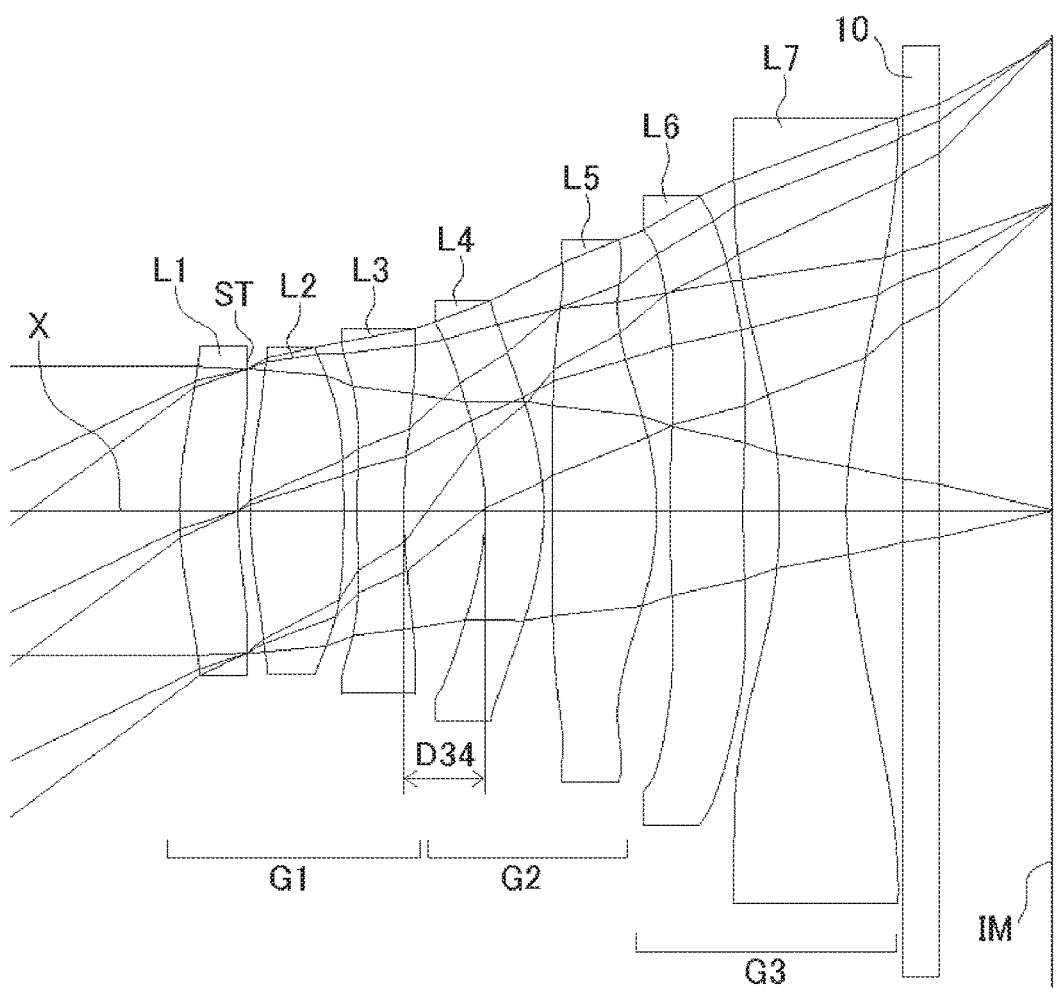
FIG. 1 shows a sectional view of a schematic configuration of an imaging lens in Numerical Data Example 1 according to an embodiment of the present invention.

As shown in FIG. 1, according to the embodiment, the imaging lens includes a first lens group G1 having positive refractive power, a second lens group G2 having positive refractive power, and a third lens group G3 having negative refractive power, arranged in the order from an object side to an image plane side. Between the third lens group G3 and an image plane IM of an imaging element, there is provided a filter 10. The filter 10 is omissible.

The first lens group G1 includes a first lens L1 having positive refractive power, an aperture stop ST, a second lens L2 having positive refractive power, and a third lens L3 having negative refractive power, arranged in the order from the object side. According to the imaging lens of the embodiment, the aperture stop ST is provided on an image plane-side surface of the first lens L1. The position of the aperture stop ST is not limited to between the first lens L1 and the second lens L2 as in the imaging lens of Numerical Data Example 1. For example, the aperture stop ST may be disposed on the object side of the first lens L1. Accordingly, in case of a so-called "front aperture"-type lens configuration, in which the aperture stop ST is disposed on the object side of the imaging lens, it is achievable to improve assembling efficiency and to reduce the manufacturing cost of the imaging lens. In case of the "aperture stop in front" type lens configuration, it is also relatively easy to shorten a total optical length of the imaging lens. Therefore, such lens configuration is an effective lens configuration for mounting in portable devices, such as cellular phones and smartphones that are widely used in these days. On the other hand, in case of a so-called "middle aperture"-type lens configuration, in which the aperture stop ST is disposed between the first lens L1 and the second lens L2 as in Numerical Data Example 1, an effective diameter of the first lens L1 is large in comparison with the total optical length of the imaging lens. As a result, the presence of the imaging lens in a camera is emphasized. Therefore, it is possible to appeal to users by the luxurious impression, high lens performance, etc., as a part of design of the camera.

In the first lens group G1, the first lens L1 is formed in a shape such that a curvature radius r1 of an object-side surface thereof and a curvature radius r2 of an image plane-side surface thereof are both positive, so as to have a shape of a meniscus lens directing a convex surface thereof to an object side near an optical axis X. The shape of the first lens L1 is not limited to the one in Numerical Data Example 1. The first lens L1 can be formed in any shape, as long as the curvature radius r1 of the object-side surface thereof is positive. More specifically, the first lens L1 can also be formed in a shape such that the curvature radius r2 is negative, so as to have a shape of a biconvex lens near the optical axis. Here, in order to more effectively attain downsizing of the imaging lens, the first lens L1 is preferably formed to have a shape of a meniscus lens directing a convex surface thereof to the object side near the optical axis X.

The second lens L2 is formed in a shape such that a curvature radius r3 of an object-side surface thereof is positive and a curvature radius r4 of an image plane-side surface thereof is negative, so as to have a shape of a biconvex lens near the optical axis X.

The third lens L3 is formed in a shape such that a curvature radius r5 of an object-side surface thereof and a curvature radius r6 of an image plane-side surface thereof are both positive, so as to have a shape of a meniscus lens directing a convex surface thereof to the object side near the optical axis X. The shape of the third lens L3 is not limited to the one in Numerical Data Example 1. The third lens can be formed in any shape, as long as the curvature radius r6 of the image plane-side surface is positive. Numerical Data Examples 2 through 4 are examples, in which the third lens L3 is formed in a shape, such that the curvature radius r5 of the object side surface thereof is negative, i.e., so as to have a shape of a biconcave lens near the optical axis X.

The second lens group G2 includes a fourth lens L4 having negative refractive power, and a fifth lens L5 having positive refractive power, arranged in the order from the object side. The second lens group G2 can be configured in any manner as long as the second lens group is composed of the two lenses and the composite refractive power of those two lenses is positive. Numerical Data Example 2 through 5 are examples, in which the second lens group G2 is composed of the fourth lens L4 having positive refractive power and the fifth lens L5 having negative refractive power. Numerical Data Example 6 is an example, in which the second lens group G2 is composed of the fourth lens L4 and the fifth lens L5, which have positive refractive powers.

In the second lens group G2, the fourth lens L4 is formed in a shape such that a curvature radius r7 of an object-side surface thereof and a curvature radius r8 of an image plane-side surface thereof are both negative, so as to have a shape of a meniscus lens directing a concave surface thereof to the object side near the optical axis X.

On the other hand, the fifth lens L5 is formed in a shape such that a curvature radius r9 of an object-side surface thereof is positive and a curvature radius r10 of an image plane-side surface thereof is negative, so as to have a shape of a biconvex lens near the optical axis X. The shape of the fifth lens L5 is not limited to the one in Numerical Data Example 1. Numerical Data Examples 2 through 5 are examples, in which the fifth lens L5 is formed in a shape, such that the curvature radius r10 is positive, i.e., so as to have a shape of a meniscus lens directing a convex surface thereof to the object side near the optical axis X. Numerical Data Example 6 is an example, in which the fifth lens L5 is formed in a shape, such that the curvature radius r9 is negative, i.e., so as to have a shape of a meniscus lens directing a concave surface thereof to the object side near the optical axis X.

The third lens group G3 includes a sixth lens L6 having negative refractive power, and a seventh lens L7 having negative refractive power, arranged in the order from the object side. The sixth lens L6 is formed in a shape such that a curvature radius r11 of an object-side surface thereof and a curvature radius r12 of an image plane-side surface thereof are both positive, so as to have a shape of a meniscus lens directing a convex surface thereof to the object side near the optical axis X.

The seventh lens L7 is formed in a shape such that a curvature radius r13 of an object-side surface thereof is negative and a curvature radius r14 of an image plane-side surface thereof is positive, so as to have a shape of a biconcave lens near the optical axis X. In the seventh lens L7, the object-side surface thereof and the image plane-side surface thereof are formed as aspheric shapes, so as to have strong positive refractive power as it goes to the periphery of the lens from the optical axis X. With such shape of the seventh lens L7, it is achievable to satisfactorily correct off-axis chromatic aberration of magnification as well as the axial chromatic aberration. In addition, it is also achievable to suitably restrain an incident angle of a light beam emitted from the imaging lens to the image plane IM within the range of CRA.

The shape of the seventh lens L7 is not limited to the one in Numerical Data Example 1. The seventh lens L7 can be formed in any shape, as long as the curvature radius r14 of the image plane-side surface thereof is positive. Numerical Data Example 5 is an example, in which the seventh lens L7 is formed in a shape, such that the curvature radius r13 is positive, so as to have a shape of a meniscus lens directing a convex surface thereof to the object side near the optical axis X.

According to the embodiment, the imaging lens satisfies the following conditional expressions (1) to (12):

$$40 < vd1 < 75 \quad (1)$$

$$40 < vd2 < 75 \quad (2)$$

$$20 < vd3 < 35 \quad (3)$$

$$40 < vd7 < 75 \quad (4)$$

$$2.5 < f1/f2 < 30 \quad (5)$$

$$0.5 < f12/f < 1.1 \quad (6)$$

$$-1.0 < f2/f3 < -0.2 \quad (7)$$

$$-1.0 < f12/f3 < -0.1 \quad (8)$$

$$-1.5 < f67/f < -0.5 \quad (9)$$

$$-3 < f45/f67 < -0.8 \quad (10)$$

$$0.02 < f7/f6 < 0.3 \quad (11)$$

$$0.03 < D34/f < 0.2 \quad (12)$$

vd1: Abbe's number of the first lens L1
vd2: Abbe's number of the second lens L2
vd3: Abbe's number of the third lens L3
vd7: Abbe's number of the seventh lens L7
f: Focal length of a whole lens system
f1: Focal length of the first lens L1
f2: Focal length of the second lens L2
f3: Focal length of the third lens L3
f6: Focal length of the sixth lens L6
f7: Focal length of the seventh lens L7
f12: Composite focal length of the first lens L1 and the second lens L2
f45: Composite focal length of the fourth lens L4 and the fifth lens L5
f67: Composite focal length of the sixth lens L6 and the seventh lens L7
D34: Distance on the optical axis X between the third lens L3 and the fourth lens L4

Here, it is not necessary to satisfy all of the conditional expressions, and it is achievable to obtain an effect corresponding to the respective conditional expression when any single one of the conditional expressions is individually satisfied.

In the embodiment, all lens surfaces are formed as an aspheric surface. When the aspheric shapes applied to the lens surfaces have an axis Z in a direction of the optical axis X, a height H in a direction perpendicular to the optical axis X, a conic constant k, and aspheric coefficients $A_4$, $A_6$, $A_8$, $A_{10}$, $A_{12}$, $A_{14}$, and $A_{16}$, the aspheric shapes of the lens surfaces are expressed with the following formula:

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index, and vd represents an Abbe's number, respectively. Here, aspheric surfaces are indicated with surface numbers i affixed with * (asterisk).

Numerical Data Example 1

Basic data are shown below.
f=3.44 mm, Fno=2.2, ω=37.0°

Unit: mm

Surface Data

| Surface Number i | r | d | nd | vd |
|---|---|---|---|---|
| (Object) | ∞ | ∞ | | |
| 1* | 2.255 | 0.317 | 1.5346 | 56.1 (=vd1) |
| 2* (Stop) | 2.436 | 0.065 | | |
| 3* | 2.400 | 0.500 | 1.5346 | 56.1 (=vd2) |
| 4* | −8.336 | 0.071 | | |
| 5* | 5.370 | 0.250 | 1.6355 | 24.0 (=vd3) |
| 6* | 2.997 | 0.436 (=D34) | | |
| 7* | −1.358 | 0.315 | 1.5346 | 56.1 (=vd4) |
| 8* | −1.506 | 0.048 | | |
| 9* | 57.269 | 0.557 | 1.5346 | 56.1 (=vd5) |
| 10* | −1.579 | 0.072 | | |
| 11* | 6.586 | 0.390 | 1.6355 | 24.0 (=vd6) |
| 12* | 5.835 | 0.197 | | |
| 13* | −3.293 | 0.359 | 1.5346 | 56.1 (=vd7) |
| 14* | 2.281 | 0.300 | | |
| 15 | ∞ | 0.200 | 1.5168 | 64.2 |
| 16 | ∞ | 0.601 | | |
| (Image plane) | ∞ | | | |

Aspheric Surface Data

First Surface k = 0.000, $A_4$ = −1.114E−01, $A_6$ = 1.716E−01, $A_8$ = −6.753E−01, $A_{10}$ = 9.113E−01, $A_{12}$ = −4.349E−01, $A_{14}$ = −1.715E−01, $A_{16}$ = 2.030E−01
Second Surface -continued Unit: mm k = 0.000, $A_4$ = −2.098E−01, $A_6$ = 4.528E−01, $A_8$ = −3.217, $A_{10}$ = 6.995, $A_{12}$ = −4.687, $A_{14}$ = −2.463, $A_{16}$ = 3.568
Third Surface k = 0.000, $A_4$ = −4.970E−02, $A_6$ = −1.500E−01, $A_8$ = −7.221E−01, $A_{10}$ = 1.724, $A_{12}$ = −6.829E−01, $A_{14}$ = −6.475E−01, $A_{16}$ = 6.175E−01
Fourth Surface k = 0.000, $A_4$ = −2.271E−01, $A_6$ = −7.422E−02, $A_8$ = 3.681E−02, $A_{10}$ = 4.386E−01, $A_{12}$ = −6.822E−01, $A_{14}$ = 3.633E−01, $A_{16}$ = 1.075E−01
Fifth Surface k = 0.000, $A_4$ = −2.983E−01, $A_6$ = −5.158E−01, $A_8$ = 1.744, $A_{10}$ = −2.258, $A_{12}$ = 1.053, $A_{14}$ = 8.637E−01, $A_{16}$ = −7.917E−01
Sixth Surface k = 0.000, $A_4$ = −7.205E−02, $A_6$ = −4.150E−01, $A_8$ = 1.298, $A_{10}$ = −1.771, $A_{12}$ = 8.587E−01, $A_{14}$ = 2.137E−01, $A_{16}$ = −2.201E−01
Seventh Surface k = 0.000, $A_4$ = 2.681E−01, $A_6$ = −2.030E−01, $A_8$ = 2.977E−01, $A_{10}$ = 5.153E−02, $A_{12}$ = −5.830E−01, $A_{14}$ = 3.652E−01, $A_{16}$ = −1.807E−02
Eighth Surface k = 0.000, $A_4$ = 1.636E−01, $A_6$ = −1.044E−01, $A_8$ = 1.139E−01, $A_{10}$ = −4.936E−02, $A_{12}$ = 4.089E−03, $A_{14}$ = −5.458E−03, $A_{16}$ = 7.198E−03
Ninth Surface k = 0.000, $A_4$ = −2.036E−02, $A_6$ = 1.008E−01, $A_8$ = −9.426E−02, $A_{10}$ = 3.535E−02, $A_{12}$ = 4.329E−03, $A_{14}$ = −6.757E−03, $A_{16}$ = 8.930E−04
Tenth Surface k = 0.000, $A_4$ = 9.355E−02, $A_6$ = 6.215E−02, $A_8$ = 7.676E−03, $A_{10}$ = −9.918E−03, $A_{12}$ = −4.698E−04, $A_{14}$ = −2.538E−04, $A_{16}$ = 2.680E−04
Eleventh Surface k = 0.000, $A_4$ = −9.058E−02, $A_6$ = 1.506E−02, $A_8$ = −7.881E−03, $A_{10}$ = 7.829E−03, $A_{12}$ = −5.240E−04, $A_{14}$ = −3.709E−04, $A_{16}$ = −1.445E−04
Twelfth Surface k = 0.000, $A_4$ = −1.402E−01, $A_6$ = 4.012E−02, $A_8$ = 1.525E−03, $A_{10}$ = −2.457E−03, $A_{12}$ = −1.461E−05, $A_{14}$ = 1.635E−04, $A_{16}$ = −3.523E−05
Thirteenth Surface k = 0.000, $A_4$ = −6.802E−02, $A_6$ = 1.037E−01, $A_8$ = −4.345E−02, $A_{10}$ = 1.099E−02, $A_{12}$ = −3.796E−03, $A_{14}$ = 1.273E−03, $A_{16}$ = −1.683E−04
Fourteenth Surface k = 0.000, $A_4$ = −1.616E−01, $A_6$ = 1.157E−01, $A_8$ = −6.605E−02, $A_{10}$ = 2.465E−02, $A_{12}$ = −5.885E−03, $A_{14}$ = 8.025E−04, $A_{16}$ = −4.741E−05 f1 = 35.25 mm
f2 = 3.54 mm
f3 = −11.13 mm
f4 = −99.63 mm
f5 = 2.88 mm
f6 = −100.83 mm
f7 = −2.47 mm
f12 = 3.38 mm
f45 = 2.73 mm
f67 = −2.45 mm

The values of the respective conditional expressions are as follows:

f1/f2=9.95 f12/f=0.98 f2/f3=−0.32

$f12/f3=-0.30$ $f67/f=-0.71$ $f45/f67=-1.113$ $f7/f6=0.024$ $D34/f=0.13$

Accordingly, the imaging lens of Numerical Data Example 1 satisfies the above-described conditional expressions. The distance on the optical axis X from the object-side surface of the first lens L1 to the image plane IM (air conversion length for the filter 10) is 4.61 mm, and downsizing of the imaging lens is attained.

Figure 2:
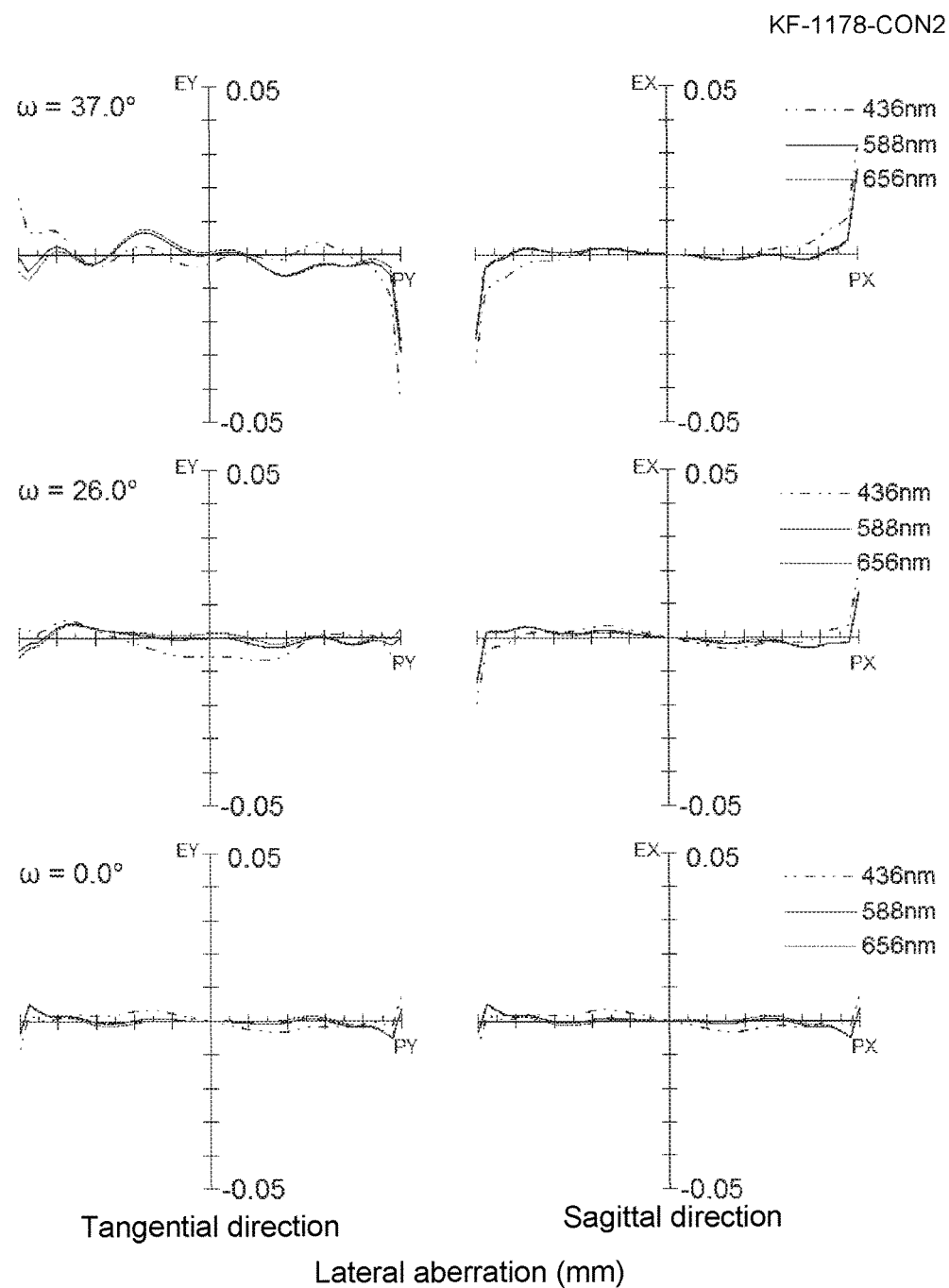
FIG. 2 is an aberration diagram showing a lateral aberration of the imaging lens of FIG. 1.
Figure 3:
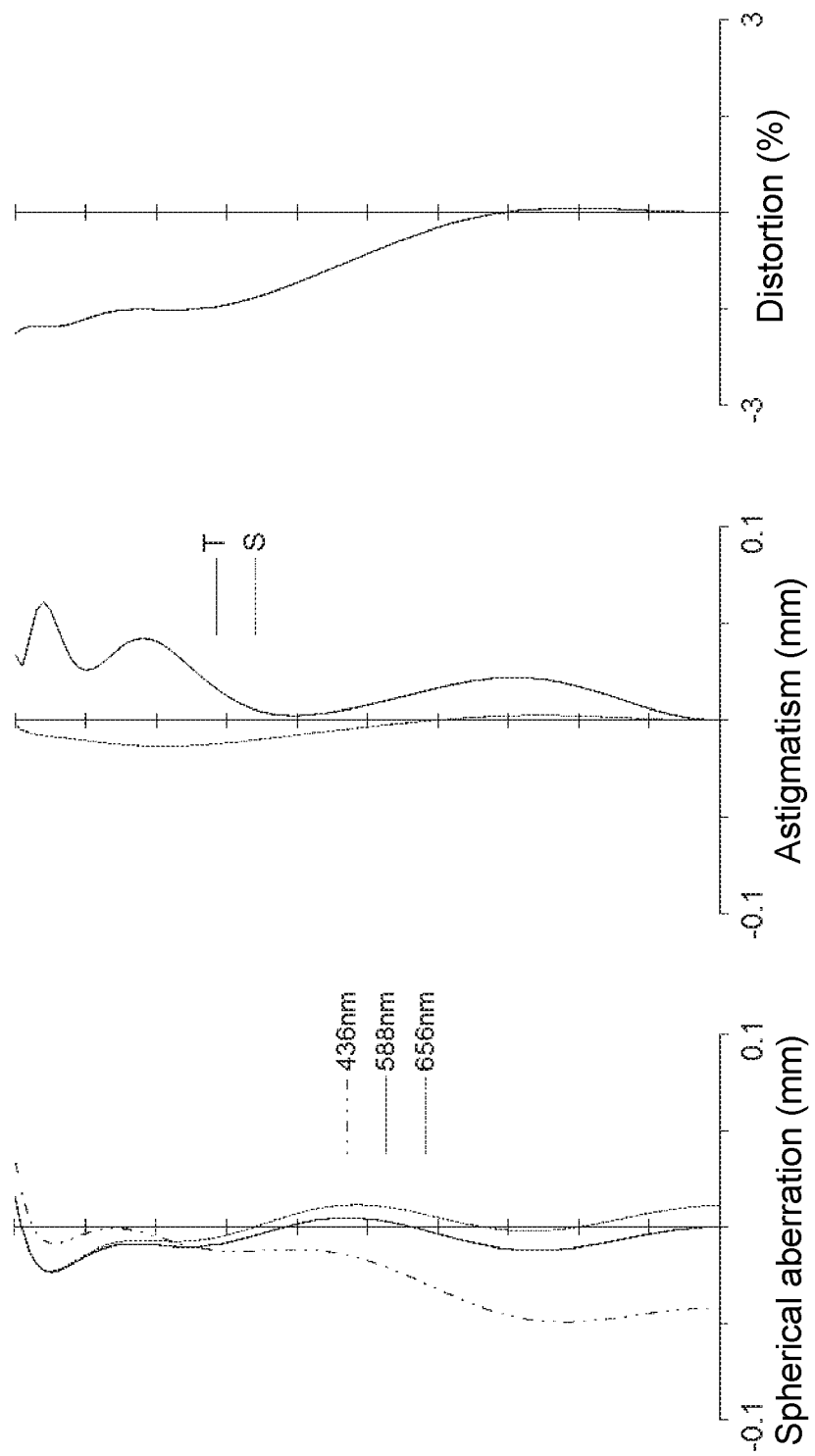
FIG. 3 is an aberration diagram showing a spherical aberration, astigmatism, and a distortion of the imaging lens of FIG. 1.
Figure 4:
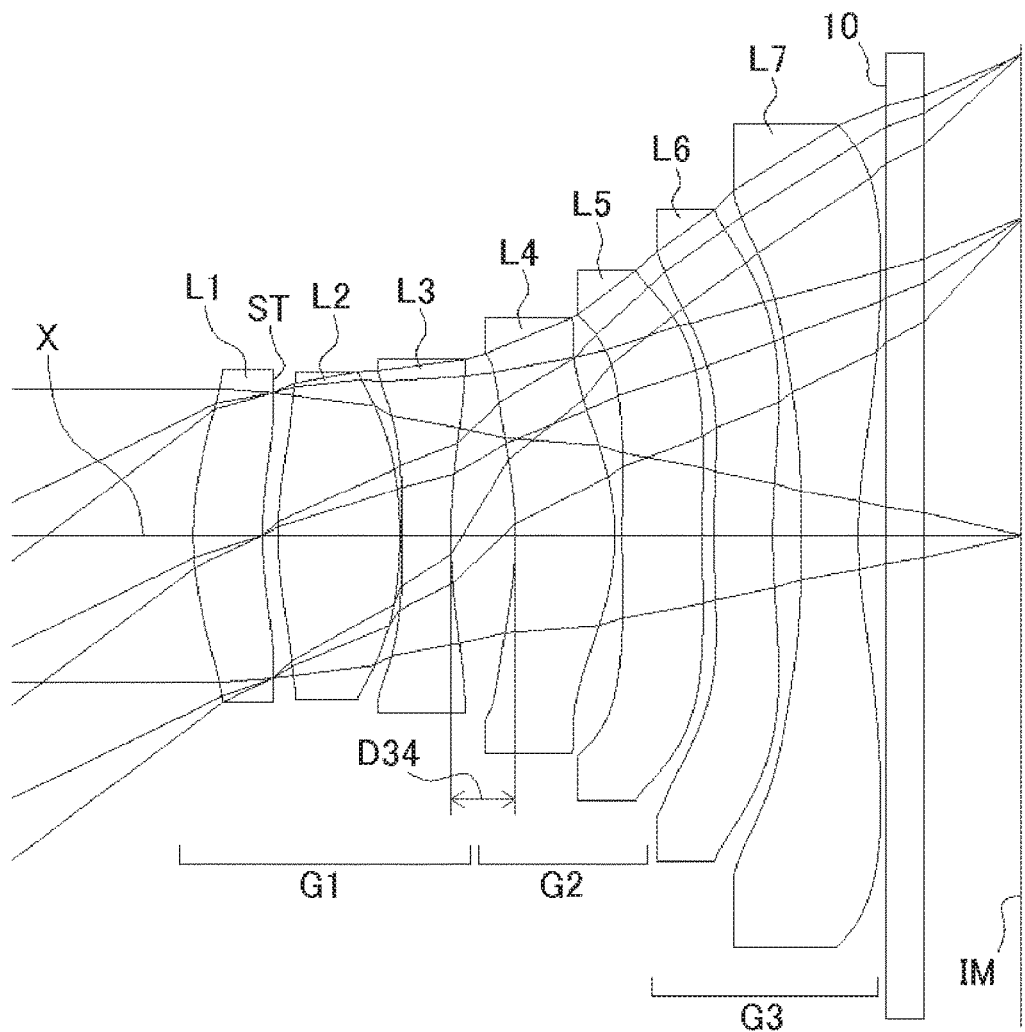
FIG. 4 shows a sectional view of a schematic configuration of an imaging lens in Numerical Data Example 2 according to the embodiment of the present invention.

FIG. 2 shows a lateral aberration that corresponds to a half angle of view ω, which is divided into a tangential direction and a sagittal direction (The same is true for FIGS. 5, 8, 11, 14, and 17). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, and 18). As shown in FIGS. 2 and 3, according to the imaging lens of Numerical Data Example 1, the aberrations are satisfactorily corrected.

Numerical Data Example 2

Basic data are shown below.
f=3.37 mm, Fno=2.2, ω=37.0°

Unit: mm

Surface Data

| Surface Number i | r | d | nd | νd |
|---|---|---|---|---|
| (Object) | ∞ | ∞ | | |
| 1* | 1.687 | 0.360 | 1.5346 | 56.1 (=νd1) |
| 2* (Stop) | 2.080 | 0.081 | | |
| 3* | 2.069 | 0.627 | 1.5346 | 56.1 (=νd2) |
| 4* | −2.335 | 0.012 | | |
| 5* | −12.711 | 0.250 | 1.6355 | 24.0 (=νd3) |
| 6* | 2.963 | 0.337 (=D34) | | |
| 7* | −1.851 | 0.511 | 1.5346 | 56.1 (=νd4) |
| 8* | −1.255 | 0.036 | | |
| 9* | 14.291 | 0.415 | 1.6355 | 24.0 (=νd5) |
| 10* | 11.555 | 0.060 | | |
| 11* | 5.140 | 0.303 | 1.5346 | 56.1 (=νd6) |
| 12* | 3.728 | 0.151 | | |
| 13* | −9.215 | 0.292 | 1.5346 | 56.1 (=νd7) |
| 14* | 2.376 | 0.140 | | |
| 15 | ∞ | 0.200 | 1.5168 | 64.2 |
| 16 | ∞ | 0.501 | | |
| (Image plane) | ∞ | | | |

Aspheric Surface Data

First Surface $k = 0.000, A_4 = -1.035E-01, A_6 = 1.546E-01, A_8 = -6.963E-01,$
$A_{10} = 8.976E-01, A_{12} = -4.726E-01, A_{14} = -1.734E-01, A_{16} = 2.316E-01$
Second Surface $k = 0.000, A_4 = -2.430E-01, A_6 = 3.610E-01, A_8 = -3.129,$
$A_{10} = 7.060, A_{12} = -4.768, A_{14} = -2.712, A_{16} = 3.926$
Third Surface $k = 0.000, A_4 = -1.037E-01, A_6 = -2.199E-01, A_8 = -6.181E-01,$
$A_{10} = 1.739, A_{12} = -6.029E-01, A_{14} = -5.764E-01, A_{16} = 4.109E-01$ -continued Unit: mm Fourth Surface $k = 0.000, A_4 = -1.993E-01, A_6 = 1.142E-02, A_8 = 4.385E-02,$
$A_{10} = 5.225E-01, A_{12} = -7.827E-01, A_{14} = 1.273E-02, A_{16} = 4.693E-01$
Fifth Surface $k = 0.000, A_4 = -2.463E-01, A_6 = -5.153E-01, A_8 = 1.901,$
$A_{10} = -2.250, A_{12} = 7.890E-01, A_{14} = 7.249E-01, A_{16} = -4.881E-01$
Sixth Surface $k = 0.000, A_4 = -9.455E-03, A_6 = -4.924E-01, A_8 = 1.270,$
$A_{10} = -1.695, A_{12} = 8.868E-01, A_{14} = 9.271E-02, A_{16} = -1.255E-01$
Seventh Surface $k = 0.000, A_4 = 2.488E-01, A_6 = -9.798E-02, A_8 = 1.387E-01,$
$A_{10} = -5.087E-02, A_{12} = -4.688E-01, A_{14} = 4.874E-01,$
$A_{16} = -1.679E-01$
Eighth Surface $k = 0.000, A_4 = 1.703E-01, A_6 = 6.899E-02, A_8 = 1.171E-01,$
$A_{10} = -6.243E-02, A_{12} = -1.388E-02, A_{14} = -3.738E-03, A_{16} = 7.153E-03$
Ninth Surface $k = 0.000, A_4 = -1.639E-01, A_6 = 1.073E-01, A_8 = -8.969E-02,$
$A_{10} = 9.542E-03, A_{12} = -4.894E-03, A_{14} = -4.582E-03, A_{16} = 4.992E-03$
Tenth Surface $k = 0.000, A_4 = -1.500E-01, A_6 = 5.422E-02, A_8 = -2.166E-02,$
$A_{10} = -9.624E-03, A_{12} = 1.901E-03, A_{14} = 7.129E-04, A_{16} = 6.232E-04$
Eleventh Surface $k = 0.000, A_4 = -2.030E-01, A_6 = 2.297E-03, A_8 = 2.201E-02,$
$A_{10} = 2.780E-04, A_{12} = 6.385E-04, A_{14} = -7.657E-05,$
$A_{16} = -2.699E-04$
Twelfth Surface $k = 0.000, A_4 = -1.577E-01, A_6 = 2.996E-02, A_8 = 2.442E-03,$
$A_{10} = -2.418E-03, A_{12} = -2.139E-04, A_{14} = 1.344E-04, A_{16} = 1.979E-05$
Thirteenth Surface $k = 0.000, A_4 = -9.538E-02, A_6 = 9.840E-02, A_8 = -4.715E-02,$
$A_{10} = 1.099E-02, A_{12} = -3.581E-03, A_{14} = 1.355E-03,$
$A_{16} = -1.798E-04$
Fourteenth Surface $k = 0.000, A_4 = -2.024E-01, A_6 = 1.307E-01, A_8 = -6.820E-02,$
$A_{10} = 2.474E-02, A_{12} = -5.882E-03, A_{14} = 7.922E-04,$
$A_{16} = -4.563E-05$ f1 = 12.65 mm
f2 = 2.16 mm
f3 = −3.76 mm
f4 = 5.61 mm
f5 = −100.94 mm
f6 = −27.45 mm
f7 = −3.50 mm
f12 = 2.01 mm
f45 = 5.88 mm
f67 = −3.13 mm The values of the respective conditional expressions are as follows:

$f1/f2=5.86$ $f12/f=0.60$ $f2/f3=-0.57$ $f12/f3=-0.54$ $f67/f=-0.93$ $f45/f67=-1.88$ $f7/f6=0.13$ $D34/f=0.10$

Accordingly, the imaging lens of Numerical Data Example 2 satisfies the above-described conditional expressions. The distance on the optical axis from the object-side surface of the first lens L1 to the image plane IM (air conversion length for the filter 10) is 4.21 mm, and downsizing of the imaging lens is attained.

Figure 5:
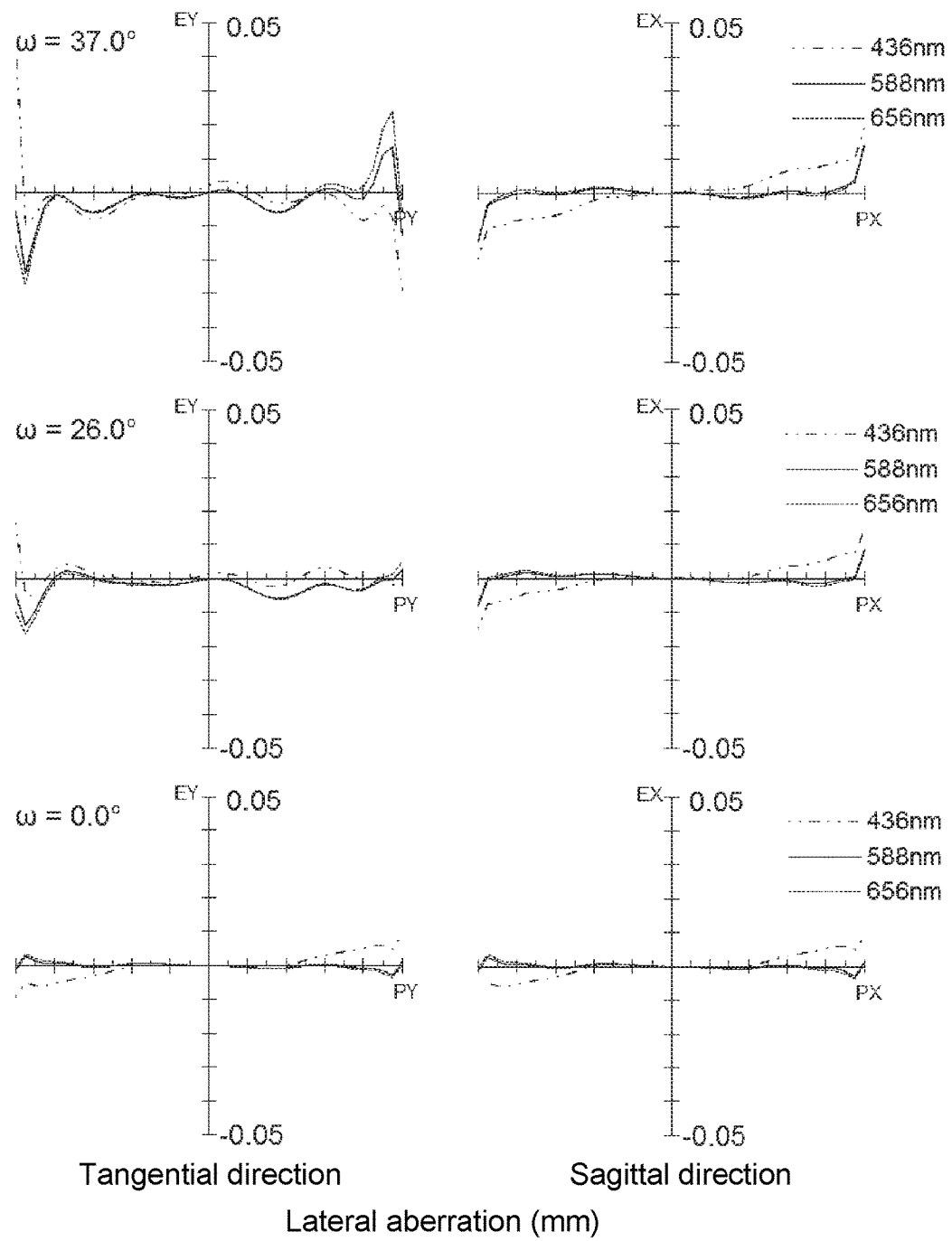
FIG. 5 is an aberration diagram showing a lateral aberration of the imaging lens of FIG. 4.
Figure 6:
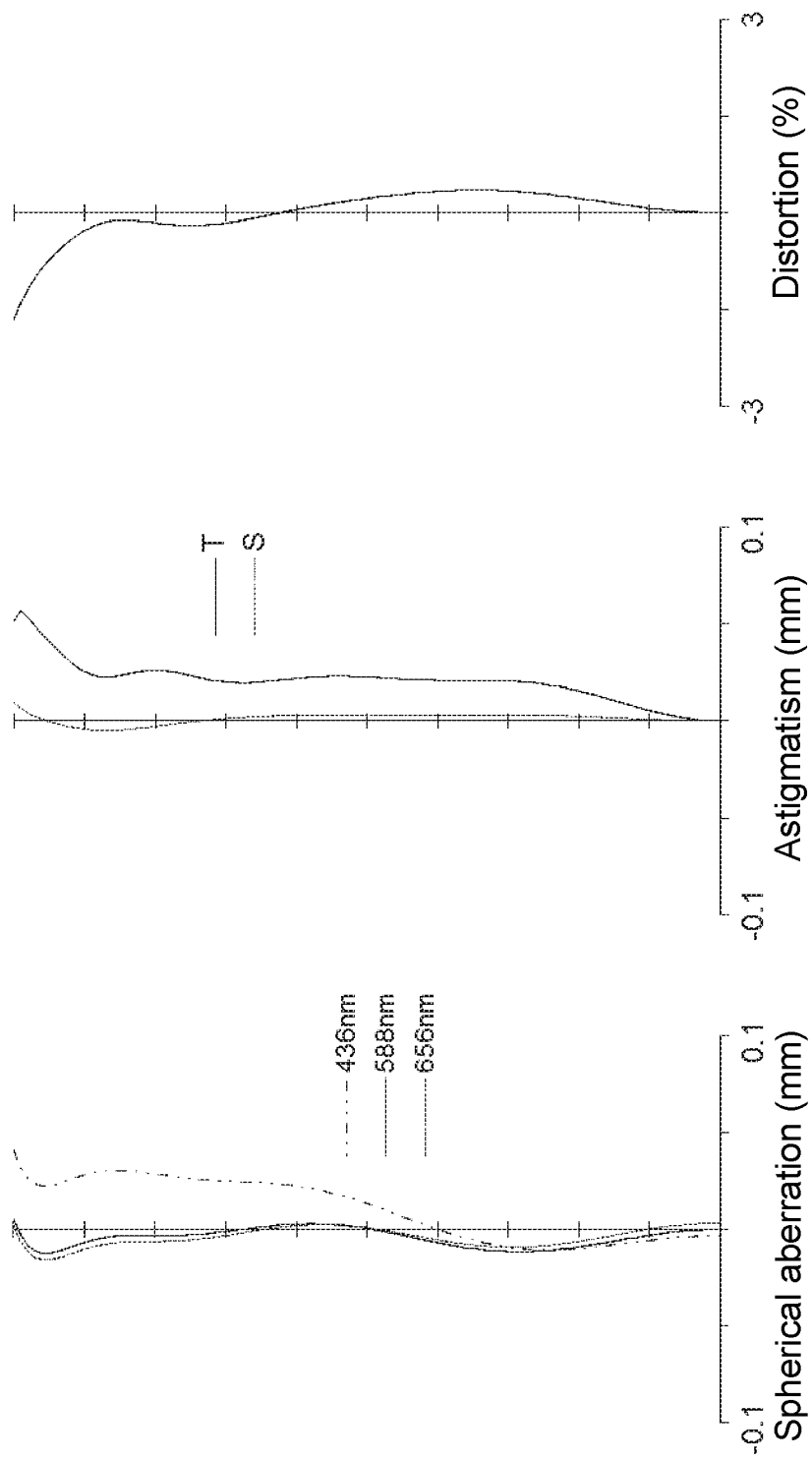
FIG. 6 is an aberration diagram showing a spherical aberration, astigmatism, and a distortion of the imaging lens of FIG. 4.
Figure 7:
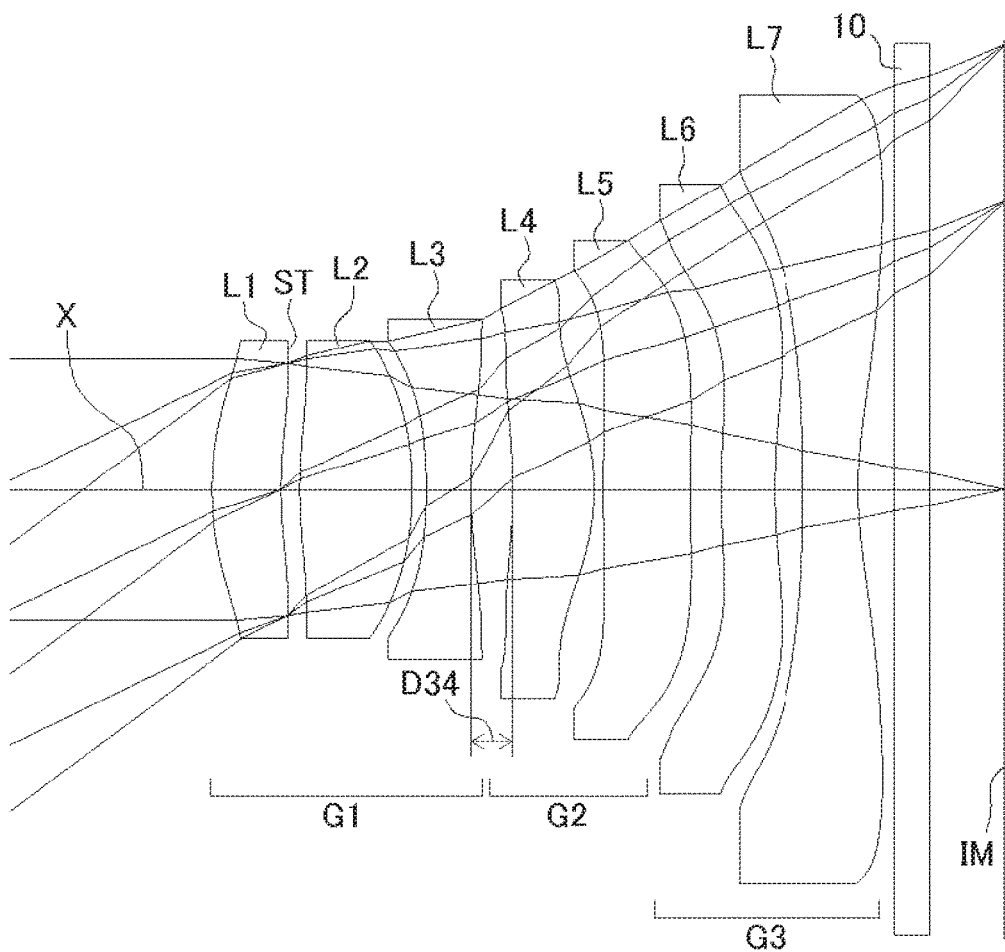
FIG. 7 shows a sectional view of a schematic configuration of an imaging lens in Numerical Data Example 3 according to the embodiment of the present invention.

FIG. 5 shows a lateral aberration that corresponds to the half angle of view ω, and FIG. 6 shows a spherical aberration (mm), astigmatism (mm), and a distortion (%), respectively, for the imaging lens of Numerical Data Example 2. As shown in FIGS. 5 and 6, according to the imaging lens of Numerical Data Example 2, the aberrations are also satisfactorily corrected.

Numerical Data Example 3

Basic data are shown below.
f=3.37 mm, Fno=2.3, ω=37.0°

Unit: mm

Surface Data

| Surface Number i | r | d | nd | vd |
|---|---|---|---|---|
| (Object) | ∞ | ∞ | | |
| 1* | 1.680 | 0.386 | 1.5346 | 56.1 (=vd1) |
| 2* (Stop) | 2.599 | 0.104 | | |
| 3* | 3.000 | 0.626 | 1.5346 | 56.1 (=vd2) |
| 4* | -1.962 | 0.078 | | |
| 5* | -3.345 | 0.250 | 1.6355 | 24.0 (=vd3) |
| 6* | 2.882 | 0.238 (=D34) | | |
| 7* | -2.871 | 0.452 | 1.5346 | 56.1 (=vd4) |
| 8* | -1.267 | 0.050 | | |
| 9* | 11.980 | 0.486 | 1.6355 | 24.0 (=vd5) |
| 10* | 9.931 | 0.170 | | |
| 11* | 4.056 | 0.300 | 1.5346 | 56.1 (=vd6) |
| 12* | 3.372 | 0.157 | | |
| 13* | -23.911 | 0.310 | 1.5346 | 56.1 (=vd7) |
| 14* | 2.380 | 0.200 | | |
| 15 | ∞ | 0.200 | 1.5168 | 64.2 |
| | ∞ | 0.414 | | |
| (Image plane) | ∞ | | | |

Aspheric Surface Data

First Surface k = 0.000, $A_4$ = -8.241E-02, $A_6$ = 1.518E-01, $A_8$ = -6.952E-01, $A_{10}$ = 8.909E-01, $A_{12}$ = -4.931E-01, $A_{14}$ = -1.811E-01, $A_{16}$ = 2.666E-01
Second Surface k = 0.000, $A_4$ = -2.275E-01, $A_6$ = 3.836E-01, $A_8$ = -3.017, $A_{10}$ = 6.945, $A_{12}$ = -4.983, $A_{14}$ = -2.666, $A_{16}$ = 4.176
Third Surface k = 0.000, $A_4$ = -1.432E-01, $A_6$ = -1.337E-01, $A_8$ = -6.040E-01, $A_{10}$ = 1.794, $A_{12}$ = -6.104E-01, $A_{14}$ = -7.571E-01, $A_{16}$ = 2.584E-01
Fourth Surface k = 0.000, $A_4$ = -1.073E-01, $A_6$ = -5.463E-02, $A_8$ = -4.255E-03, $A_{10}$ = 5.463E-01, $A_{12}$ = -6.893E-01, $A_{14}$ = -1.210E-02, $A_{16}$ = 1.850E-01
Fifth Surface k = 0.000, $A_4$ = -2.576E-01, $A_6$ = -4.667E-01, $A_8$ = 1.903, $A_{10}$ = -2.336, $A_{12}$ = 6.689E-01, $A_{14}$ = 7.776E-01, $A_{16}$ = -4.608E-01

-continued

Unit: mm

Sixth Surface k = 0.000, $A_4$ = -7.944E-02, $A_6$ = -4.418E-01, $A_8$ = 1.276, $A_{10}$ = -1.711, $A_{12}$ = 8.974E-01, $A_{14}$ = 6.691E-02, $A_{16}$ = -1.087E-01
Seventh Surface k = 0.000, $A_4$ = 2.513E-01, $A_6$ = -1.421E-01, $A_8$ = 1.263E-01, $A_{10}$ = -1.827E-02, $A_{12}$ = -4.186E-01, $A_{14}$ = 5.029E-01, $A_{16}$ = -1.843E-01
Eighth Surface k = 0.000, $A_4$ = 1.919E-01, $A_6$ = 7.248E-02, $A_8$ = 1.153E-01, $A_{10}$ = -6.760E-02, $A_{12}$ = -2.090E-02, $A_{14}$ = -5.478E-03, $A_{16}$ = 9.951E-03
Ninth Surface k = 0.000, $A_4$ = -1.001E-01, $A_6$ = 9.987E-02, $A_8$ = -9.297E-02, $A_{10}$ = 1.434E-02, $A_{12}$ = 1.058E-05, $A_{14}$ = -2.628E-03, $A_{16}$ = 2.872E-03
Tenth Surface k = 0.000, $A_4$ = -1.569E-01, $A_6$ = 5.735E-02, $A_8$ = -1.942E-02, $A_{10}$ = -9.047E-03, $A_{12}$ = 1.646E-03, $A_{14}$ = 4.727E-04, $A_{16}$ = 5.869E-04
Eleventh Surface k = 0.000, $A_4$ = -2.248E-01, $A_6$ = 1.366E-03, $A_8$ = 2.158E-02, $A_{10}$ = 1.515E-04, $A_{12}$ = 6.444E-04, $A_{14}$ = -3.185E-05, $A_{16}$ = -2.051E-04
Twelfth Surface k = 0.000, $A_4$ = -1.554E-01, $A_6$ = 2.774E-02, $A_8$ = 2.233E-03, $A_{10}$ = -2.424E-03, $A_{12}$ = -2.127E-04, $A_{14}$ = 1.357E-04, $A_{16}$ = 1.991E-05
Thirteenth Surface k = 0.000, $A_4$ = -1.038E-01, $A_6$ = 9.883E-02, $A_8$ = -4.721E-02, $A_{10}$ = 1.096E-02, $A_{12}$ = -3.591E-03, $A_{14}$ = 1.353E-03, $A_{16}$ = -1.801E-04
Fourteenth Surface k = 0.000, $A_4$ = -1.990E-01, $A_6$ = 1.305E-01, $A_8$ = -6.810E-02, $A_{10}$ = 2.478E-02, $A_{12}$ = -5.877E-03, $A_{14}$ = 7.925E-04, $A_{16}$ = -4.580E-05 f1 = 7.75 mm
f2 = 2.32 mm
f3 = -2.40 mm
f4 = 3.86 mm
f5 = -100.64 mm
f6 = -44.16 mm
f7 = -4.03 mm
f12 = 1.98 mm
f45 = 3.95 mm
f67 = -3.76 mm

The values of the respective conditional expressions are as follows:

$f1/f2=3.34$ $f12/f=0.59$ $f2/f3=-0.97$ $f12/f3=-0.83$ $f67/f=-1.11$ $f45/f67=-1.05$ $f7/f6=0.091$ $D34/f=0.070$

Accordingly, the imaging lens of Numerical Data Example 3 satisfies the above-described conditional expressions. The distance on the optical axis from the object-side surface of the first lens L1 to the image plane IM (air conversion length for the filter 10) is 4.35 mm, and downsizing of the imaging lens is attained.

Figure 8:
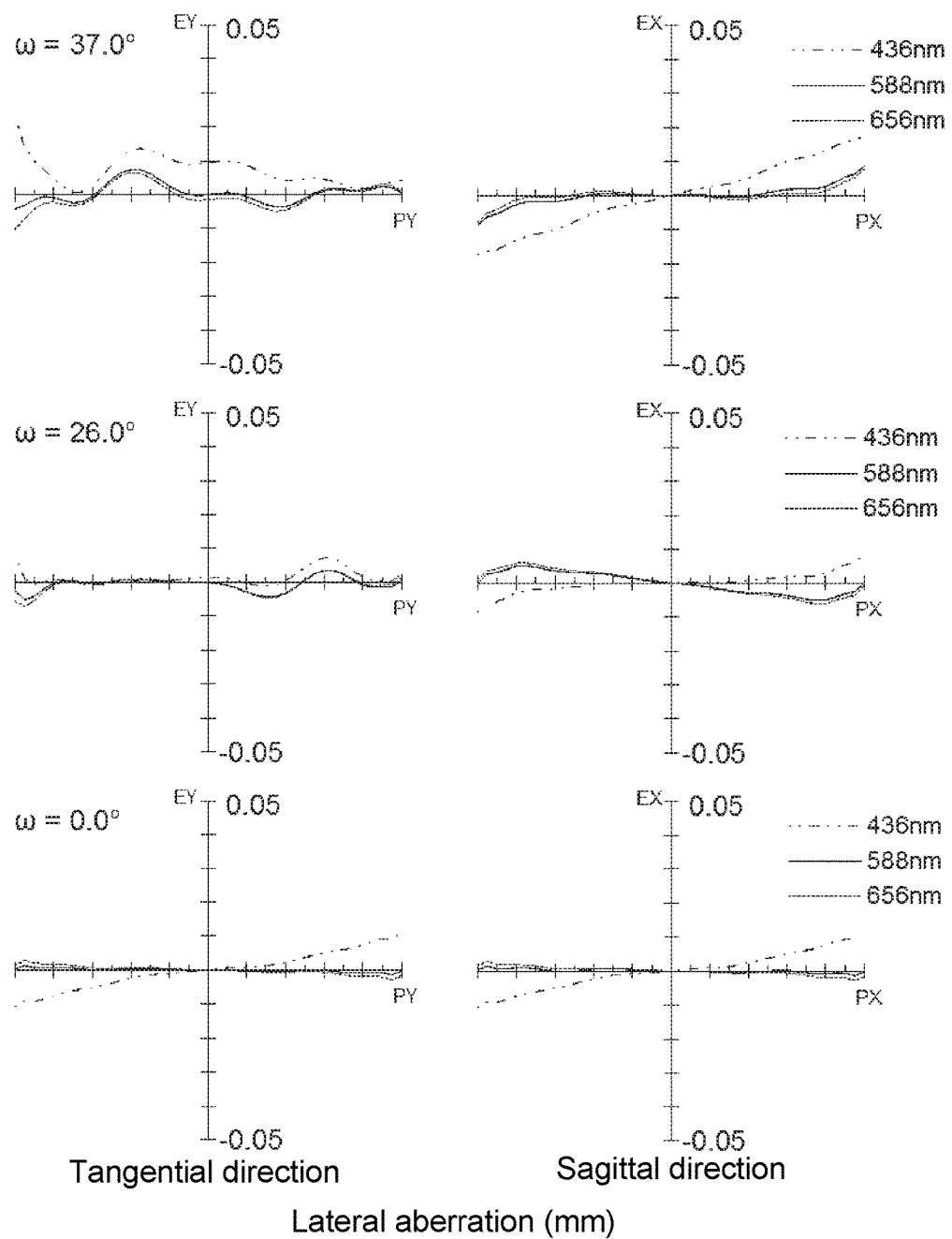
FIG. 8 is an aberration diagram showing a lateral aberration of the imaging lens of FIG. 7.
Figure 9:
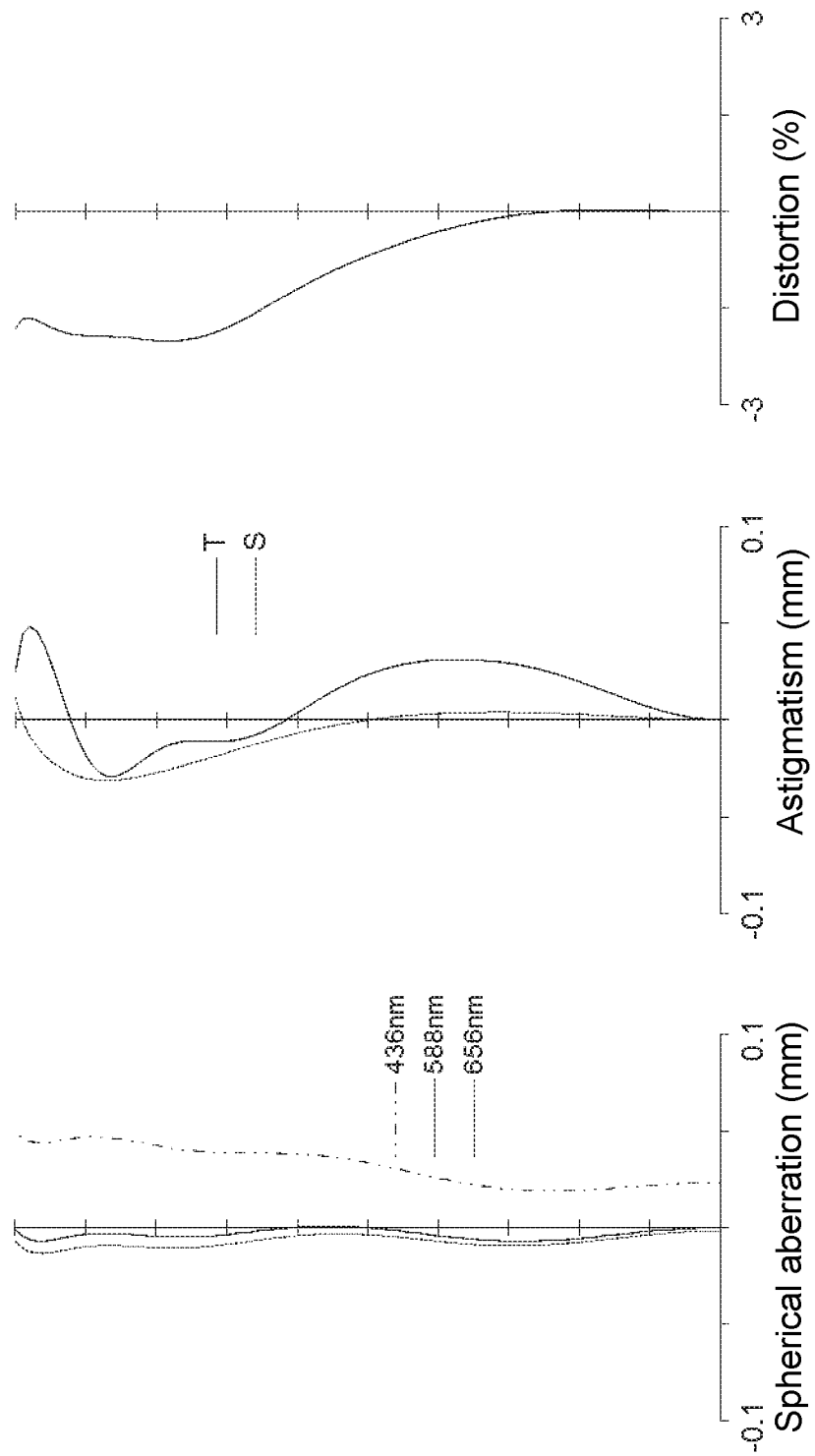
FIG. 9 is an aberration diagram showing a spherical aberration, astigmatism, and a distortion of the imaging lens of FIG. 7.
Figure 10:
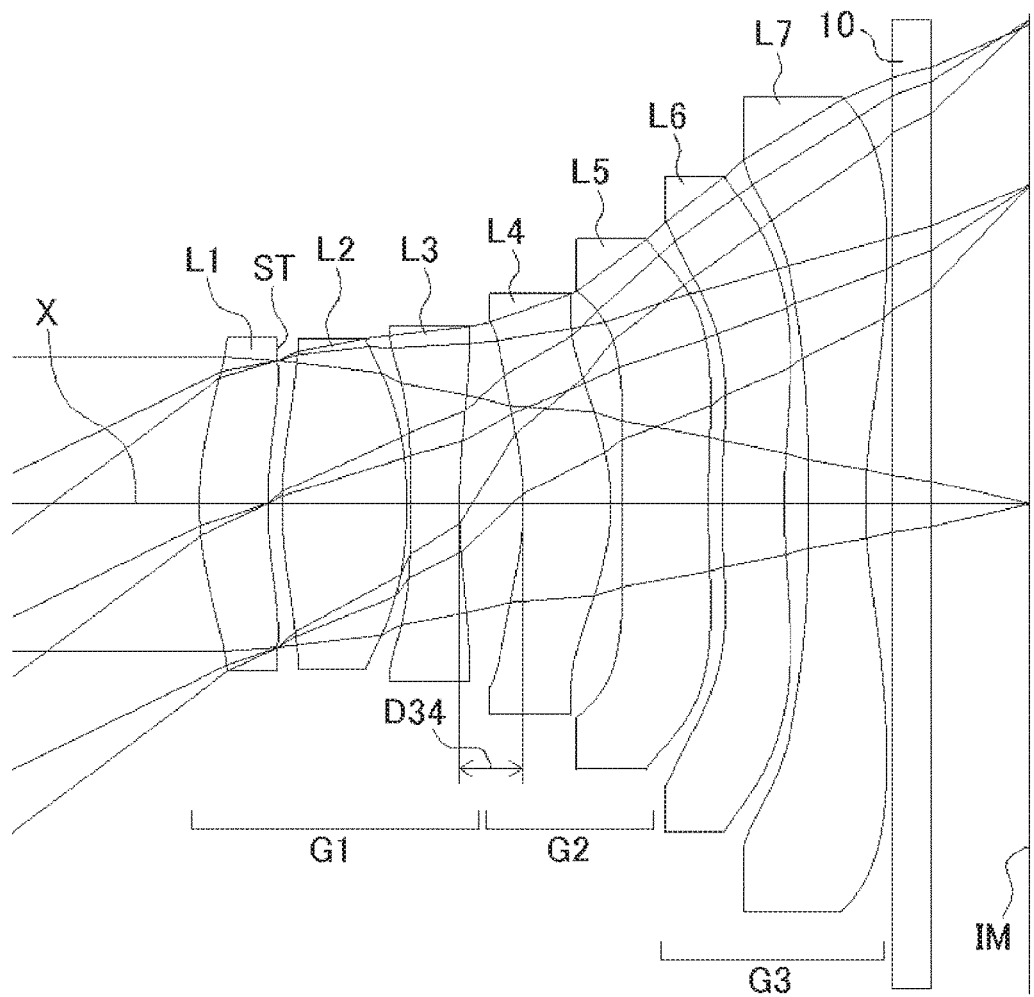
FIG. 10 shows a sectional view of a schematic configuration of an imaging lens in Numerical Data Example 4 according to the embodiment of the present invention.

FIG. 8 shows a lateral aberration that corresponds to the half angle of view ω, and FIG. 9 shows a spherical aberration (mm), astigmatism (mm), and a distortion (%), respectively, for the imaging lens of Numerical Data Example 3. As shown in FIGS. 8 and 9, according to the imaging lens of Numerical Data Example 3, the aberrations are also satisfactorily corrected.

Numerical Data Example 4

Basic data are shown below.
f=3.37 mm, Fno=2.2, ω=37.0°

Unit: mm

Surface Data

| Surface Number i | r | d | nd | vd |
|---|---|---|---|---|
| (Object) | ∞ | ∞ | | |
| 1* | 1.740 | 0.353 | 1.5346 | 56.1 (=vd1) |
| 2* (Stop) | 2.078 | 0.074 | | |
| 3* | 2.105 | 0.642 | 1.5346 | 56.1 (=vd2) |
| 4* | −2.421 | 0.021 | | |
| 5* | −17.903 | 0.250 | 1.6355 | 24.0 (=vd3) |
| 6* | 3.540 | 0.331 (=D34) | | |
| 7* | −1.594 | 0.450 | 1.5346 | 56.1 (=vd4) |
| 8* | −1.251 | 0.058 | | |
| 9* | 11.093 | 0.445 | 1.6355 | 24.0 (=vd5) |
| 10* | 6.053 | 0.070 | | |
| 11* | 4.217 | 0.319 | 1.5346 | 56.1 (=vd6) |
| 12* | 3.806 | 0.129 | | |
| 13* | −25.224 | 0.292 | 1.5346 | 56.1 (=vd7) |
| 14* | 2.369 | 0.140 | | |
| 15 | ∞ | 0.200 | 1.5168 | 64.2 |
| 16 | ∞ | 0.501 | | |
| (Image plane) | ∞ | | | |

Aspheric Surface Data

First Surface k = 0.000, $A_4$ = −1.059E−01, $A_6$ = 1.519E−01, $A_8$ = −6.957E−01, $A_{10}$ = 9.014E−01, $A_{12}$ = −4.692E−01, $A_{14}$ = −1.711E−01, $A_{16}$ = 2.338E−01
Second Surface k = 0.000, $A_4$ = −2.420E−01, $A_6$ = 3.601E−01, $A_8$ = −3.128, $A_{10}$ = 7.058, $A_{12}$ = −4.769, $A_{14}$ = −2.705, $A_{16}$ = 3.941
Third Surface k = 0.000, $A_4$ = −1.054E−01, $A_6$ = −2.159E−01, $A_8$ = −6.197E−01, $A_{10}$ = 1.737, $A_{12}$ = −5.978E−01, $A_{14}$ = −5.618E−01, $A_{16}$ = 4.096E−01
Fourth Surface k = 0.000, $A_4$ = −1.990E−01, $A_6$ = 1.660E−02, $A_8$ = 5.257E−02, $A_{10}$ = 5.262E−01, $A_{12}$ = −7.864E−01, $A_{14}$ = 7.137E−03, $A_{16}$ = 4.777E−01
Fifth Surface k = 0.000, $A_4$ = −2.303E−01, $A_6$ = −5.051E−01, $A_8$ = 1.902, $A_{10}$ = −2.253, $A_{12}$ = 7.865E−01, $A_{14}$ = 7.259E−01, $A_{16}$ = −4.857E−01
Sixth Surface k = 0.000, $A_4$ = −1.269E−02, $A_6$ = −4.889E−01, $A_8$ = 1.274, $A_{10}$ = −1.695, $A_{12}$ = 8.861E−01, $A_{14}$ = 8.995E−02, $A_{16}$ = −1.334E−01
Seventh Surface k = 0.000, $A_4$ = 2.686E−01, $A_6$ = −8.696E−02, $A_8$ = 1.475E−01, $A_{10}$ = −4.466E−02, $A_{12}$ = −4.663E−01, $A_{14}$ = 4.854E−01, $A_{16}$ = −1.752E−01
Eighth Surface -continued Unit: mm k = 0.000, $A_4$ = 1.760E−01, $A_6$ = 7.701E−02, $A_8$ = 1.205E−01, $A_{10}$ = −6.102E−02, $A_{12}$ = −1.408E−02, $A_{14}$ = −5.581E−03, $A_{16}$ = 3.934E−03
Ninth Surface k = 0.000, $A_4$ = −1.778E−01, $A_6$ = 1.010E−01, $A_8$ = −9.084E−02, $A_{10}$ = 4.372E−03, $A_{12}$ = −1.141E−02, $A_{14}$ = −7.648E−03, $A_{16}$ = 8.843E−03
Tenth Surface k = 0.000, $A_4$ = −1.619E−01, $A_6$ = 4.960E−02, $A_8$ = −2.249E−02, $A_{10}$ = −9.490E−03, $A_{12}$ = 2.128E−03, $A_{14}$ = 8.518E−04, $A_{16}$ = 6.754E−04
Eleventh Surface k = 0.000, $A_4$ = −2.120E−01, $A_6$ = 2.271E−03, $A_8$ = 2.202E−02, $A_{10}$ = 2.240E−04, $A_{12}$ = 6.022E−04, $A_{14}$ = −9.079E−05, $A_{16}$ = −2.710E−04
Twelfth Surface k = 0.000, $A_4$ = −1.486E−01, $A_6$ = 2.966E−02, $A_8$ = 2.301E−03, $A_{10}$ = −2.471E−03, $A_{12}$ = −2.360E−04, $A_{14}$ = 1.248E−04, $A_{16}$ = 1.563E−05
Thirteenth Surface k = 0.000, $A_4$ = −1.016E−01, $A_6$ = 9.787E−02, $A_8$ = −4.729E−02, $A_{10}$ = 1.095E−02, $A_{12}$ = −3.587E−03, $A_{14}$ = 1.356E−03, $A_{16}$ = −1.785E−04
Fourteenth Surface k = 0.000, $A_4$ = −2.040E−01, $A_6$ = 1.305E−01, $A_8$ = −6.819E−02, $A_{10}$ = 2.475E−02, $A_{12}$ = −5.881E−03, $A_{14}$ = 7.921E−04, $A_{16}$ = −4.569E−05 f1 = 14.67 mm
f2 = 2.22 mm
f3 = −4.63 mm
f4 = 7.46 mm
f5 = −21.71 mm
f6 = −100.33 mm
f7 = −4.04 mm
f12 = 2.09 mm
f45 = 11.40 mm
f67 = −3.97 mm

The values of the respective conditional expressions are as follows:

$f1/f2$=6.62

$f12/f$=0.62

$f2/f3$=−0.48

$f12/f3$=−0.45

$f67/f$=−1.18

$f45/f67$=−2.87

$f7/f6$=0.040

$D34/f$=0.098

Accordingly, the imaging lens of Numerical Data Example 4 satisfies the above-described conditional expressions. The distance on the optical axis from the object-side surface of the first lens L1 to the image plane IM (air conversion length for the filter 10) is 4.21 mm, and downsizing of the imaging lens is attained.

Figure 11:
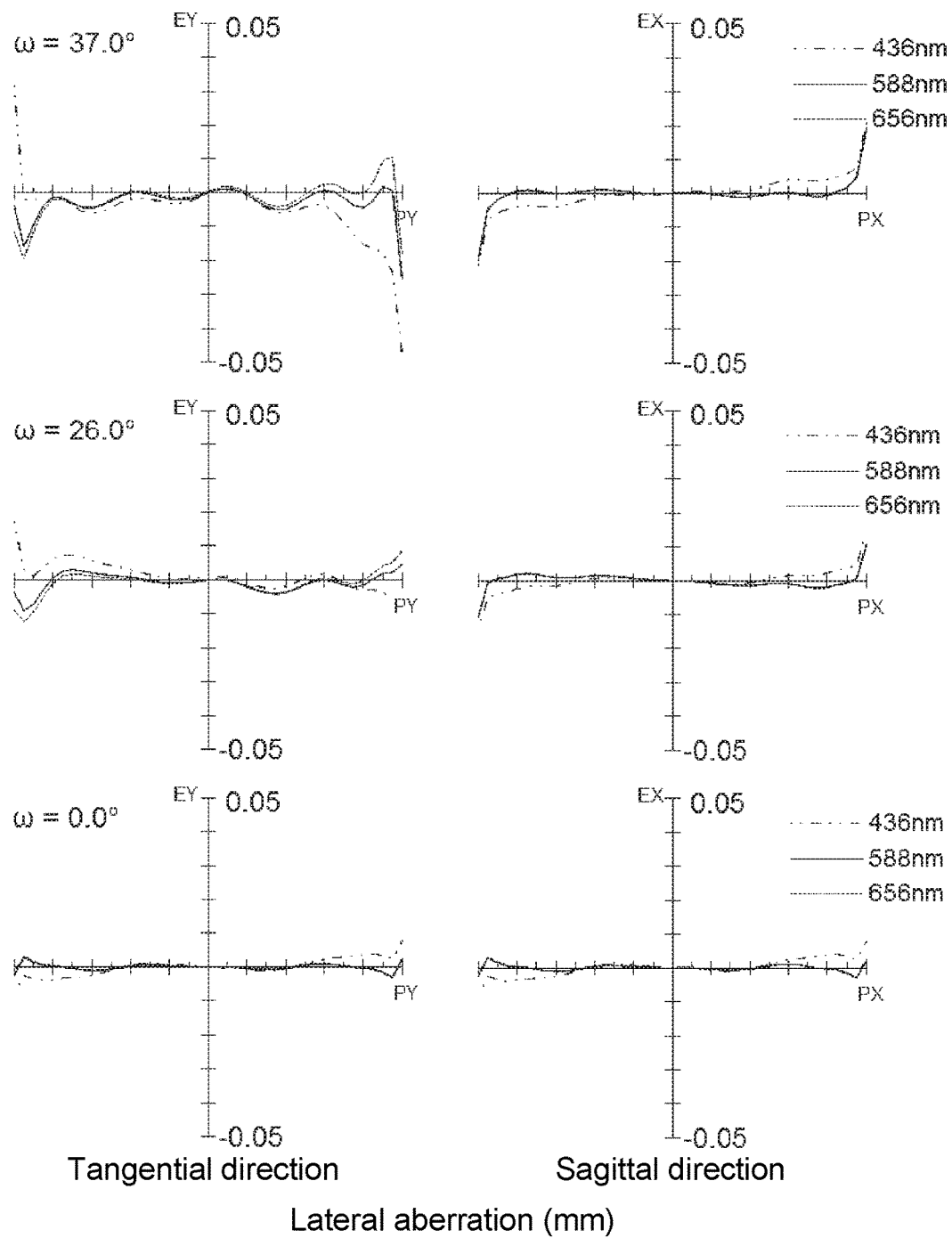
FIG. 11 is an aberration diagram showing a lateral aberration of the imaging lens of FIG. 10.
Figure 12:
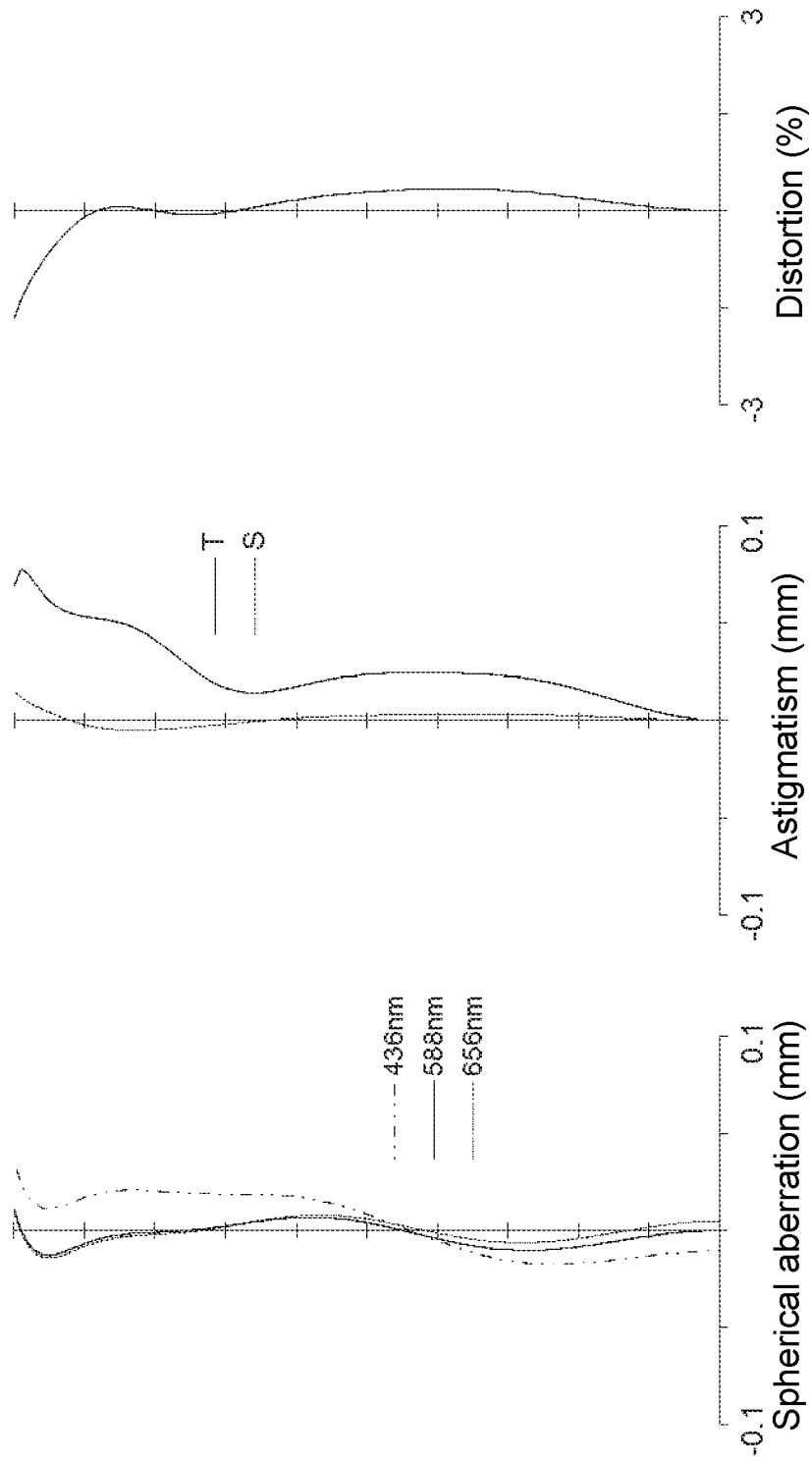
FIG. 12 is an aberration diagram showing a spherical aberration, astigmatism, and a distortion of the imaging lens of FIG. 10.
Figure 13:
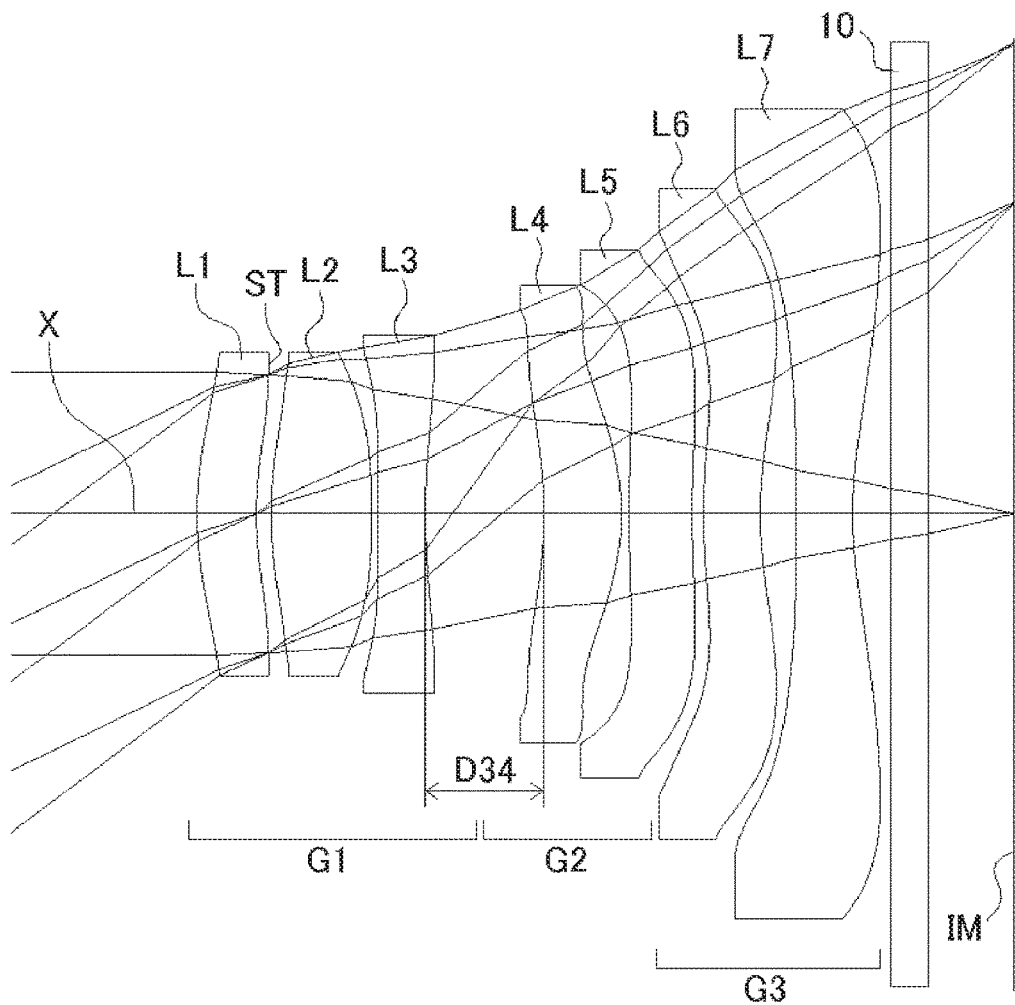
FIG. 13 shows a sectional view of a schematic configuration of an imaging lens in Numerical Data Example 5 according to the embodiment of the present invention.

FIG. 11 shows a lateral aberration that corresponds to the half angle of view ω, and FIG. 12 shows a spherical aberration (mm), astigmatism (mm), and a distortion (%), respectively, for the imaging lens of Numerical Data Example 4. As shown in FIGS. 11 and 12, according to the imaging lens of Numerical Data Example 4, the aberrations are also satisfactorily corrected.

Numerical Data Example 5

Basic data are shown below.
f=3.33 mm, Fno=2.2, ω=37.0°

Unit: mm

Surface Data

| Surface Number i | r | d | nd | νd |
|---|---|---|---|---|
| (Object) | ∞ | ∞ | | |
| 1* | 1.998 | 0.312 | 1.5346 | 56.1 (=νd1) |
| 2* (Stop) | 2.029 | 0.079 | | |
| 3* | 2.212 | 0.529 | 1.5346 | 56.1 (=νd2) |
| 4* | −3.987 | 0.031 | | |
| 5* | 12.215 | 0.250 | 1.6355 | 24.0 (=νd3) |
| 6* | 3.749 | 0.629 (=D34) | | |
| 7* | −2.154 | 0.407 | 1.5346 | 56.1 (=νd4) |
| 8* | −1.267 | 0.039 | | |
| 9* | 5.866 | 0.333 | 1.6355 | 24.0 (=νd5) |
| 10* | 5.255 | 0.060 | | |
| 11* | 3.137 | 0.298 | 1.5346 | 56.1 (=νd6) |
| 12* | 2.173 | 0.193 | | |
| 13* | 11397.590 | 0.297 | 1.5346 | 56.1 (=νd7) |
| 14* | 2.258 | 0.200 | | |
| 15 | ∞ | 0.200 | 1.5168 | 64.2 |
| 16 | ∞ | 0.447 | | |
| (Image plane) | ∞ | | | |

Aspheric Surface Data

First Surface k = 0.000, $A_4$ = −1.273E−01, $A_6$ = 1.508E−01, $A_8$ = −6.904E−01, $A_{10}$ = 9.804E−01, $A_{12}$ = −4.571E−01, $A_{14}$ = −1.739E−01, $A_{16}$ = 1.781E−01
Second Surface k = 0.000, $A_4$ = −2.502E−01, $A_6$ = 3.963E−01, $A_8$ = −3.044, $A_{10}$ = 7.055, $A_{12}$ = −4.876, $A_{14}$ = −2.735, $A_{16}$ = 4.031
Third Surface k = 0.000, $A_4$ = −8.921E−02, $A_6$ = −1.497E−01, $A_8$ = −6.485E−01, $A_{10}$ = 1.685, $A_{12}$ = −5.815E−01, $A_{14}$ = −4.625E−01, $A_{16}$ = 1.919E−01
Fourth Surface k = 0.000, $A_4$ = −2.203E−01, $A_6$ = −1.224E−02, $A_8$ = 3.919E−02, $A_{10}$ = 5.267E−01, $A_{12}$ = −7.603E−01, $A_{14}$ = 4.830E−02, $A_{16}$ = 3.557E−01
Fifth Surface k = 0.000, $A_4$ = −2.164E−01, $A_6$ = −5.134E−01, $A_8$ = 1.864, $A_{10}$ = −2.257, $A_{12}$ = 7.562E−01, $A_{14}$ = 7.189E−01, $A_{16}$ = −4.850E−01
Sixth Surface k = 0.000, $A_4$ = −2.237E−02, $A_6$ = −4.625E−01, $A_8$ = 1.272, $A_{10}$ = −1.689, $A_{12}$ = 9.042E−01, $A_{14}$ = 8.765E−02, $A_{16}$ = −1.767E−01
Seventh Surface k = 0.000, $A_4$ = 1.892E−01, $A_6$ = −8.488E−02, $A_8$ = 1.915E−01, $A_{10}$ = −6.353E−03, $A_{12}$ = −4.467E−01, $A_{14}$ = 4.821E−01, $A_{16}$ = −1.720E−01
Eighth Surface k = 0.000, $A_4$ = 1.858E−01, $A_6$ = 5.304E−02, $A_8$ = 1.167E−01, $A_{10}$ = −6.230E−02, $A_{12}$ = −1.436E−02, $A_{14}$ = −1.115E−03, $A_{16}$ = 5.918E−03
Ninth Surface k = 0.000, $A_4$ = −1.667E−01, $A_6$ = 1.096E−01, $A_8$ = −8.725E−02, $A_{10}$ = 1.457E−02, $A_{12}$ = −4.883E−03, $A_{14}$ = −7.030E−03, $A_{16}$ = 4.503E−03
Tenth Surface -continued Unit: mm k = 0.000, $A_4$ = −1.637E−01, $A_6$ = 6.542E−02, $A_8$ = −2.581E−02, $A_{10}$ = −1.078E−02, $A_{12}$ = 2.408E−03, $A_{14}$ = 1.127E−03, $A_{16}$ = 4.300E−04
Eleventh Surface k = 0.000, $A_4$ = −2.019E−01, $A_6$ = −3.117E−03, $A_8$ = 2.040E−02, $A_{10}$ = −7.931E−05, $A_{12}$ = 4.201E−04, $A_{14}$ = −7.934E−05, $A_{16}$ = −1.698E−04
Twelfth Surface k = 0.000, $A_4$ = −1.885E−01, $A_6$ = 3.279E−02, $A_8$ = 1.241E−03, $A_{10}$ = −2.764E−03, $A_{12}$ = −2.670E−04, $A_{14}$ = 1.320E−04, $A_{16}$ = 2.895E−05
Thirteenth Surface k = 0.000, $A_4$ = −1.080E−01, $A_6$ = 9.773E−02, $A_8$ = −4.668E−02, $A_{10}$ = 1.088E−02, $A_{12}$ = −3.651E−03, $A_{14}$ = 1.346E−03, $A_{16}$ = −1.710E−04
Fourteenth Surface k = 0.000, $A_4$ = −2.023E−01, $A_6$ = 1.308E−01, $A_8$ = −6.847E−02, $A_{10}$ = 2.473E−02, $A_{12}$ = −5.880E−03, $A_{14}$ = 7.920E−04, $A_{16}$ = −4.567E−05

| |
|---|
| f1 = 54.33 mm |
| f2 = 2.74 mm |
| f3 = −8.61 mm |
| f4 = 4.96 mm |
| f5 = −100.82 mm |
| f6 = −14.82 mm |
| f7 = −4.23 mm |
| f12 = 2.76 mm |
| f45 = 5.10 mm |
| f67 = −3.31 mm |

The values of the respective conditional expressions are as follows:

$f1/f2$=19.81

$f12/f$=0.83

$f2/f3$=−0.32

$f12/f3$=−0.32

$f67/f$=−0.99

$f45/f67$=−1.54

$f7/f6$=0.29

$D34/f$=0.19

Accordingly, the imaging lens of Numerical Data Example 5 satisfies the above-described conditional expressions. The distance on the optical axis from the object-side surface of the first lens L1 to the image plane IM (air conversion length for the filter 10) is 4.24 mm, and downsizing of the imaging lens is attained.

Figure 14:
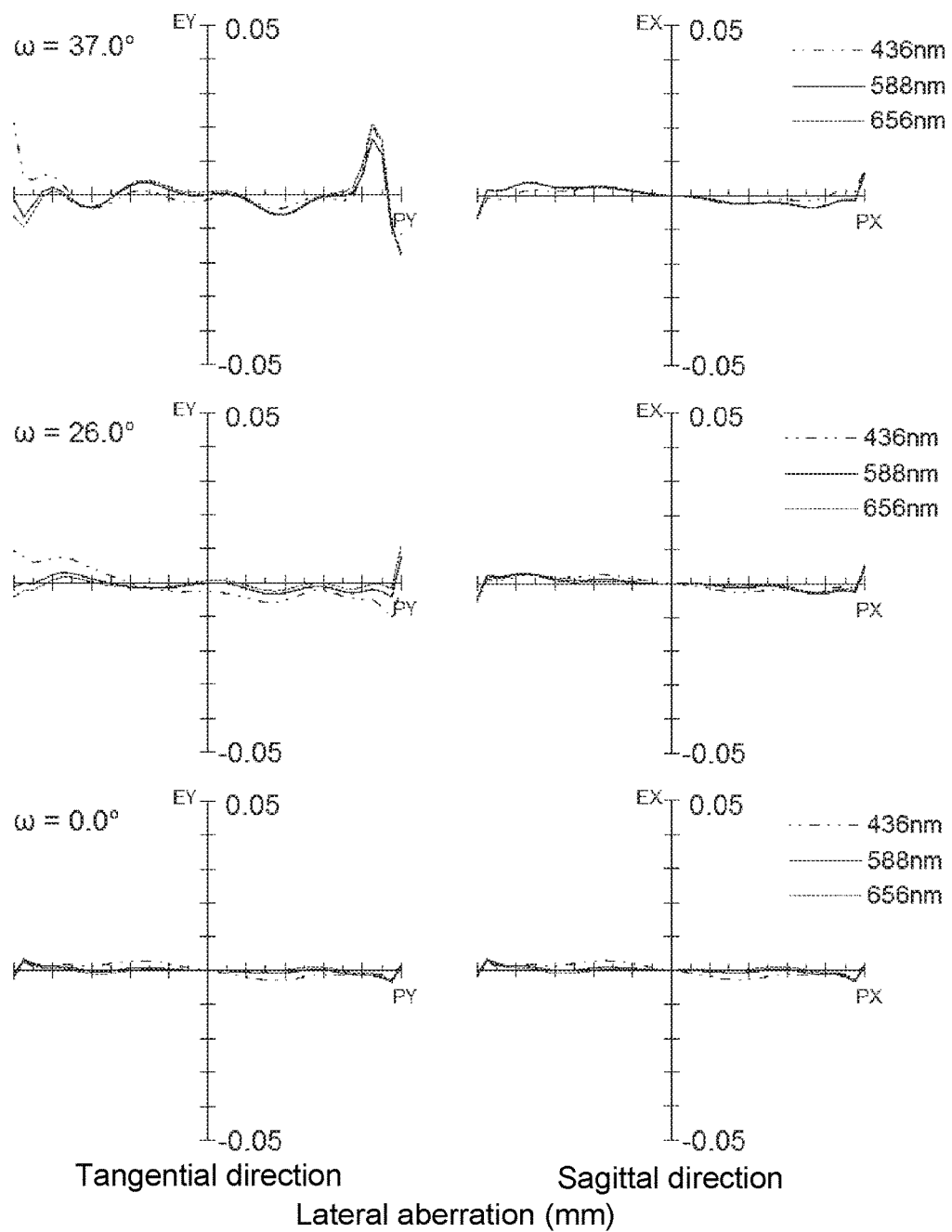
FIG. 14 is an aberration diagram showing a lateral aberration of the imaging lens of FIG. 13.
Figure 15:
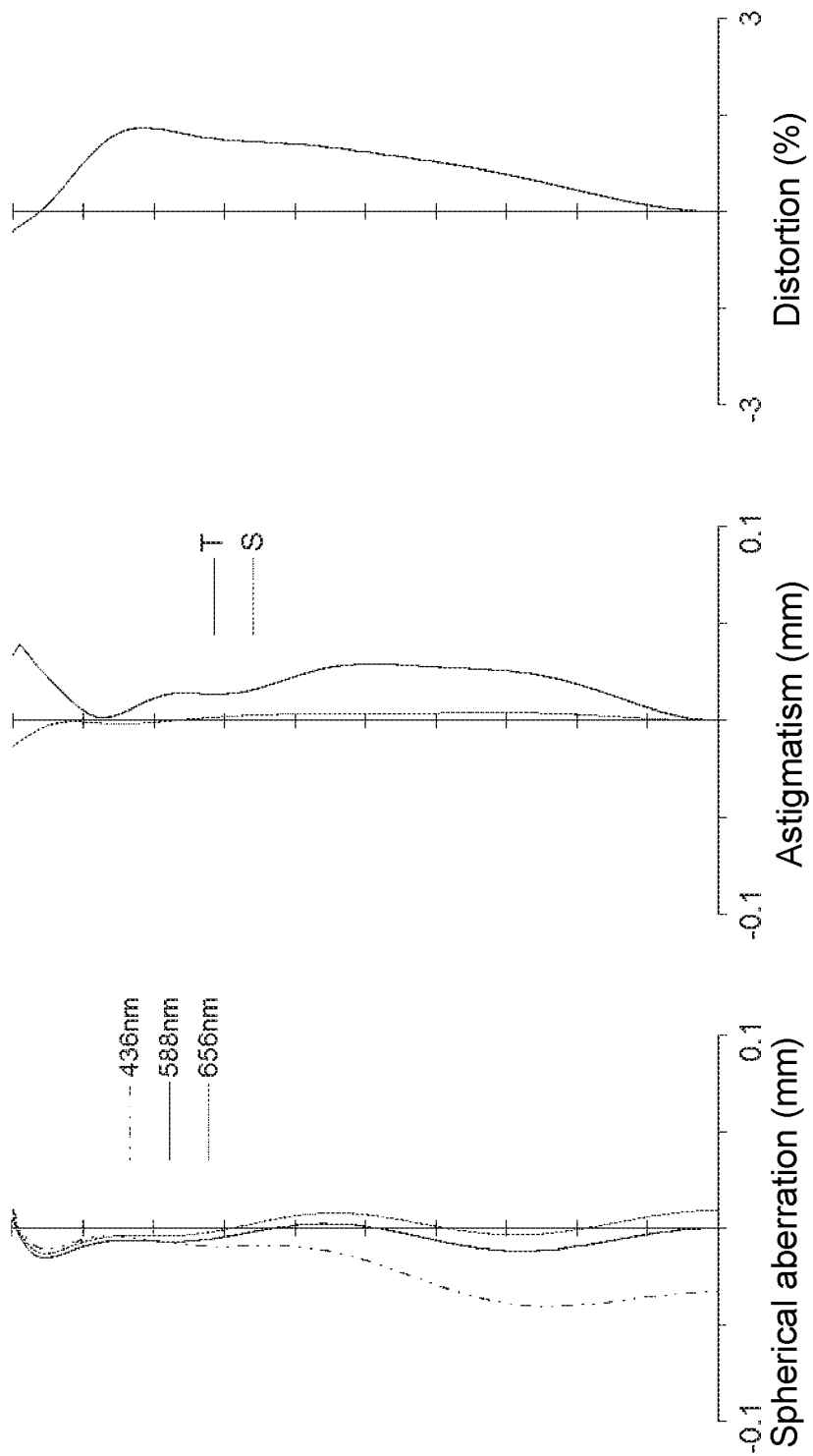
FIG. 15 is an aberration diagram showing a spherical aberration, astigmatism, and a distortion of the imaging lens of FIG. 13.
Figure 16:
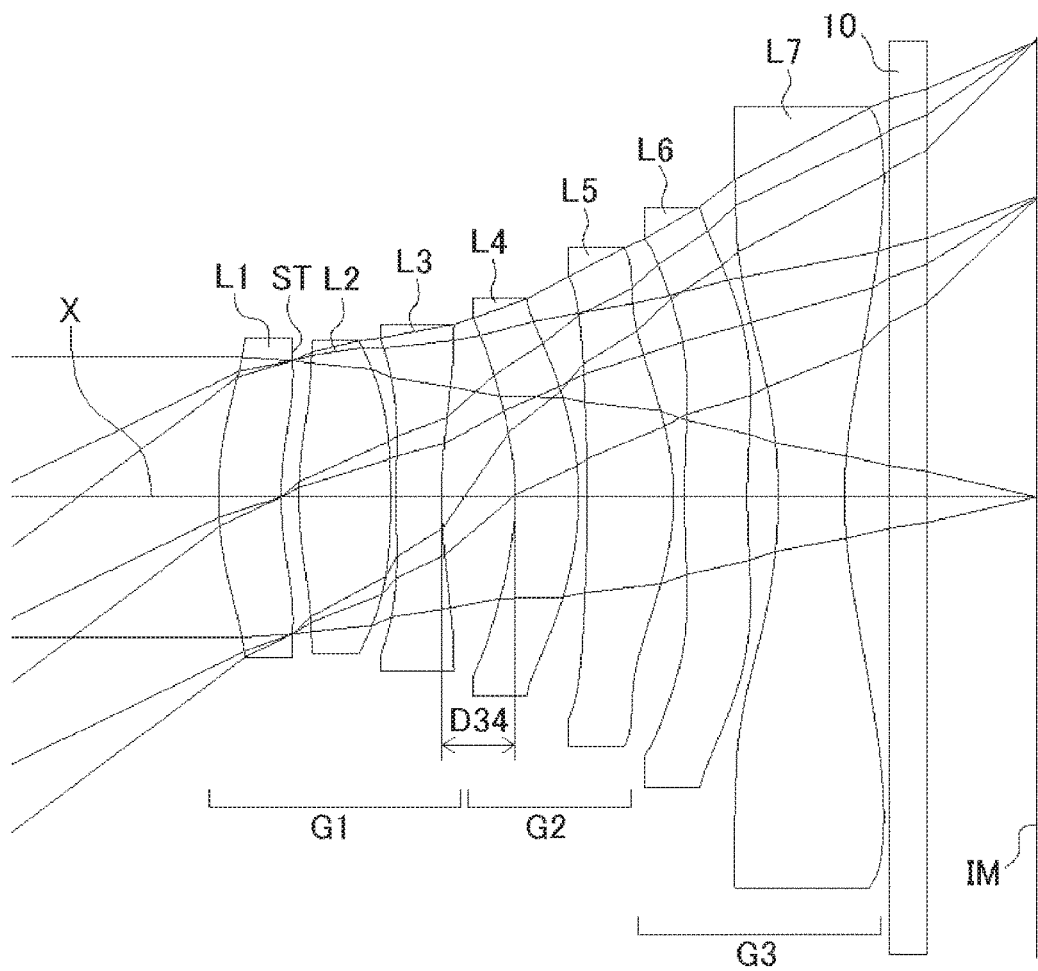
FIG. 16 shows a sectional view of a schematic configuration of an imaging lens in Numerical Data Example 6 according to the embodiment of the present invention.

FIG. 14 shows a lateral aberration that corresponds to the half angle of view ω, and FIG. 15 shows a spherical aberration (mm), astigmatism (mm), and a distortion (%), respectively, for the imaging lens of Numerical Data Example 5. As shown in FIGS. 14 and 15, according to the imaging lens of Numerical Data Example 5, the aberrations are also satisfactorily corrected.

Numerical Data Example 6

Basic data are shown below.
f=3.37 mm, Fno=2.2, ω=37.0°

Unit: mm

Surface Data

| Surface Number i | r | d | nd | vd |
|---|---|---|---|---|
| (Object) | ∞ | ∞ | | |
| 1* | 1.754 | 0.343 | 1.5346 | 56.1 (=vd1) |
| 2* (Stop) | 1.779 | 0.096 | | |
| 3* | 2.057 | 0.500 | 1.5346 | 56.1 (=vd2) |
| 4* | −5.203 | 0.030 | | |
| 5* | 8.410 | 0.250 | 1.6355 | 24.0 (=vd3) |
| 6* | 3.200 | 0.403 (=D34) | | |
| 7* | −1.580 | 0.346 | 1.5346 | 56.1 (=vd4) |
| 8* | −1.643 | 0.047 | | |
| 9* | −10.498 | 0.470 | 1.5346 | 56.1 (=vd5) |
| 10* | −1.513 | 0.060 | | |
| 11* | 5.245 | 0.342 | 1.6355 | 24.0 (=vd6) |
| 12* | 4.341 | 0.168 | | |
| 13* | −3.342 | 0.365 | 1.5346 | 56.1 (=vd7) |
| 14* | 2.330 | 0.250 | | |
| 15 | ∞ | 0.200 | 1.5168 | 64.2 |
| 16 | ∞ | 0.597 | | |
| (Image plane) | ∞ | | | |

Aspheric Surface Data

First Surface $k = 0.000, A_4 = -1.251E-01, A_6 = 1.669E-01, A_8 = -6.668E-01, A_{10} = 9.053E-01, A_{12} = -5.258E-01, A_{14} = -1.012E-01, A_{16} = 1.986E-01$
Second Surface $k = 0.000, A_4 = -3.204E-01, A_6 = 4.458E-01, A_8 = -3.063, A_{10} = 6.788, A_{12} = -5.061, A_{14} = -1.504, A_{16} = 2.998$
Third Surface $k = 0.000, A_4 = -1.540E-01, A_6 = -1.263E-01, A_8 = -7.686E-01, A_{10} = 1.771, A_{12} = -6.823E-01, A_{14} = -1.560E-01, A_{16} = -3.715E-02$
Fourth Surface $k = 0.000, A_4 = -2.584E-01, A_6 = -2.428E-02, A_8 = 1.690E-01, A_{10} = 3.337E-01, A_{12} = -7.684E-01, A_{14} = 3.283E-01, A_{16} = 1.218E-01$
Fifth Surface $k = 0.000, A_4 = -2.665E-01, A_6 = -4.280E-01, A_8 = 1.683, A_{10} = -2.114, A_{12} = 5.449E-01, A_{14} = 1.011, A_{16} = -5.988E-01$
Sixth Surface $k = 0.000, A_4 = -2.117E-02, A_6 = -4.541E-01, A_8 = 1.283, A_{10} = -1.782, A_{12} = 9.159E-01, A_{14} = 1.749E-01, A_{16} = -2.109E-01$
Seventh Surface $k = 0.000, A_4 = 1.878E-01, A_6 = -2.029E-01, A_8 = 3.026E-01, A_{10} = 4.645E-02, A_{12} = -5.625E-01, A_{14} = 3.660E-01, A_{16} = -2.208E-02$
Eighth Surface $k = 0.000, A_4 = 1.055E-01, A_6 = -1.020E-01, A_8 = 9.764E-02, A_{10} = -3.036E-02, A_{12} = 1.045E-05, A_{14} = 6.110E-04, A_{16} = 7.310E-03$
Ninth Surface $k = 0.000, A_4 = -1.538E-02, A_6 = 9.087E-02, A_8 = -1.159E-01, A_{10} = 4.385E-02, A_{12} = 4.559E-03, A_{14} = -6.675E-03, A_{16} = 2.121E-04$
Tenth Surface $k = 0.000, A_4 = 1.028E-01, A_6 = 5.866E-02, A_8 = 1.504E-02, A_{10} = -1.355E-02, A_{12} = -1.586E-03, A_{14} = 3.238E-04, A_{16} = 1.121E-04$
Eleventh Surface $k = 0.000, A_4 = -1.681E-01, A_6 = 1.559E-02, A_8 = -2.368E-03, A_{10} = 1.331E-02, A_{12} = -5.693E-04, A_{14} = -1.351E-03, A_{16} = -1.707E-04$
Twelfth Surface $k = 0.000, A_4 = -2.149E-01, A_6 = 5.930E-02, A_8 = 1.207E-03, A_{10} = -3.015E-03, A_{12} = 2.723E-04, A_{14} = 1.587E-04,$ -continued Unit: mm $A_{16} = -3.731E-05$
Thirteenth Surface $k = 0.000, A_4 = -6.768E-02, A_6 = 9.771E-02, A_8 = -3.986E-02, A_{10} = 1.101E-02, A_{12} = -3.971E-03, A_{14} = 1.268E-03, A_{16} = -1.682E-04$
Fourteenth Surface $k = 0.000, A_4 = -1.604E-01, A_6 = 1.128E-01, A_8 = -6.563E-02, A_{10} = 2.480E-02, A_{12} = -5.899E-03, A_{14} = 7.955E-04, A_{16} = -4.663E-05$ f1 = 40.46 mm
f2 = 2.83 mm
f3 = −8.28 mm
f4 = 84.01 mm
f5 = 3.25 mm
f6 = −46.45 mm
f7 = −2.51 mm
f12 = 2.83 mm
f45 = 2.93 mm
f67 = −2.43 mm The values of the respective conditional expressions are as follows:

$f1/f2=14.32$ $f12/f=0.84$ $f2/f3=-0.34$ $f12/f3=-0.34$ $f67/f=-0.72$ $f45/f67=-1.21$ $f7/f6=0.054$ $D34/f=0.12$

Accordingly, the imaging lens of Numerical Data Example 6 satisfies the above-described conditional expressions. The distance on the optical axis from the object-side surface of the first lens L1 to the image plane IM (air conversion length for the filter 10) is 4.40 mm, and downsizing of the imaging lens is attained.

Figure 17:
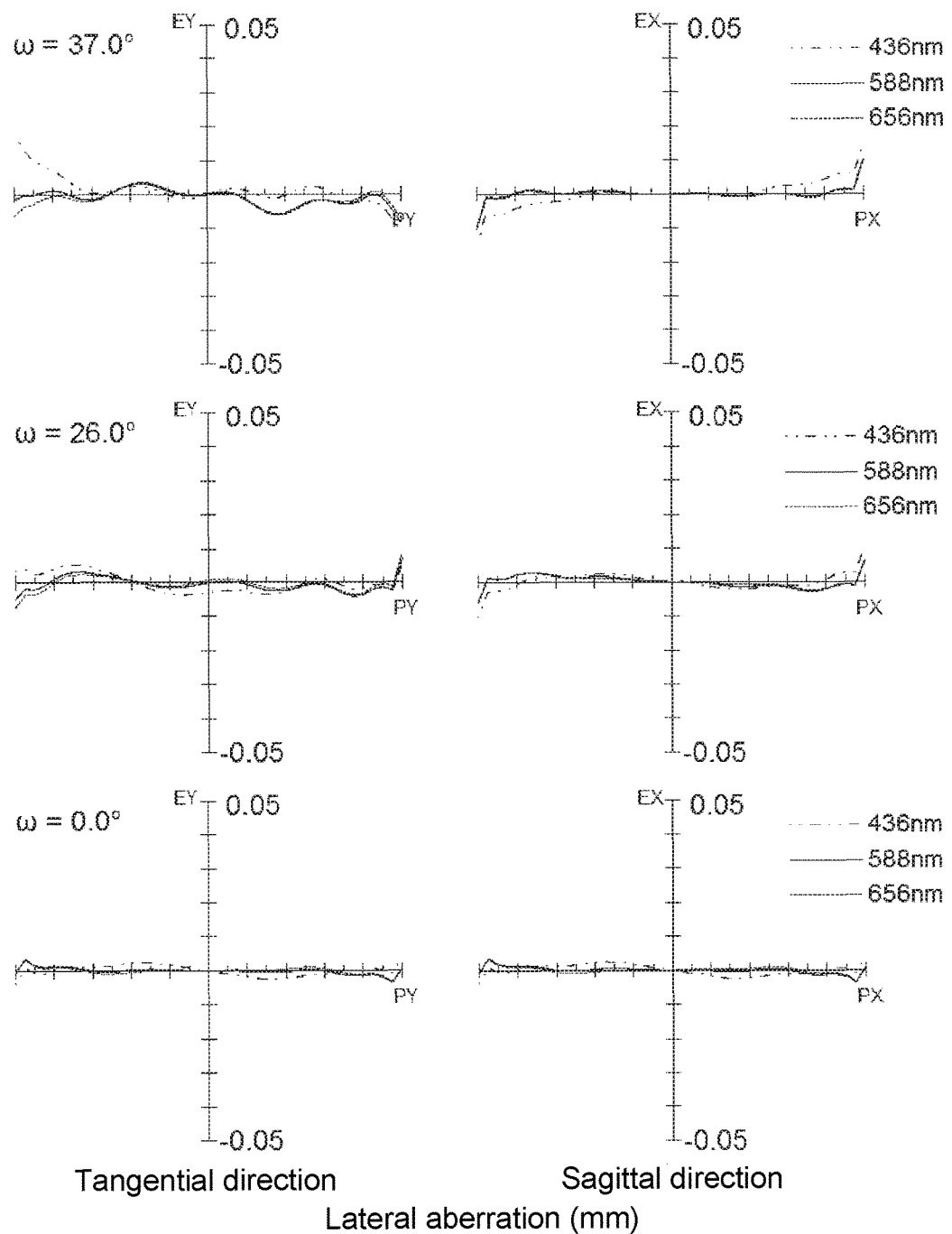
FIG. 17 is an aberration diagram showing a lateral aberration of the imaging lens of FIG. 16.
Figure 18:
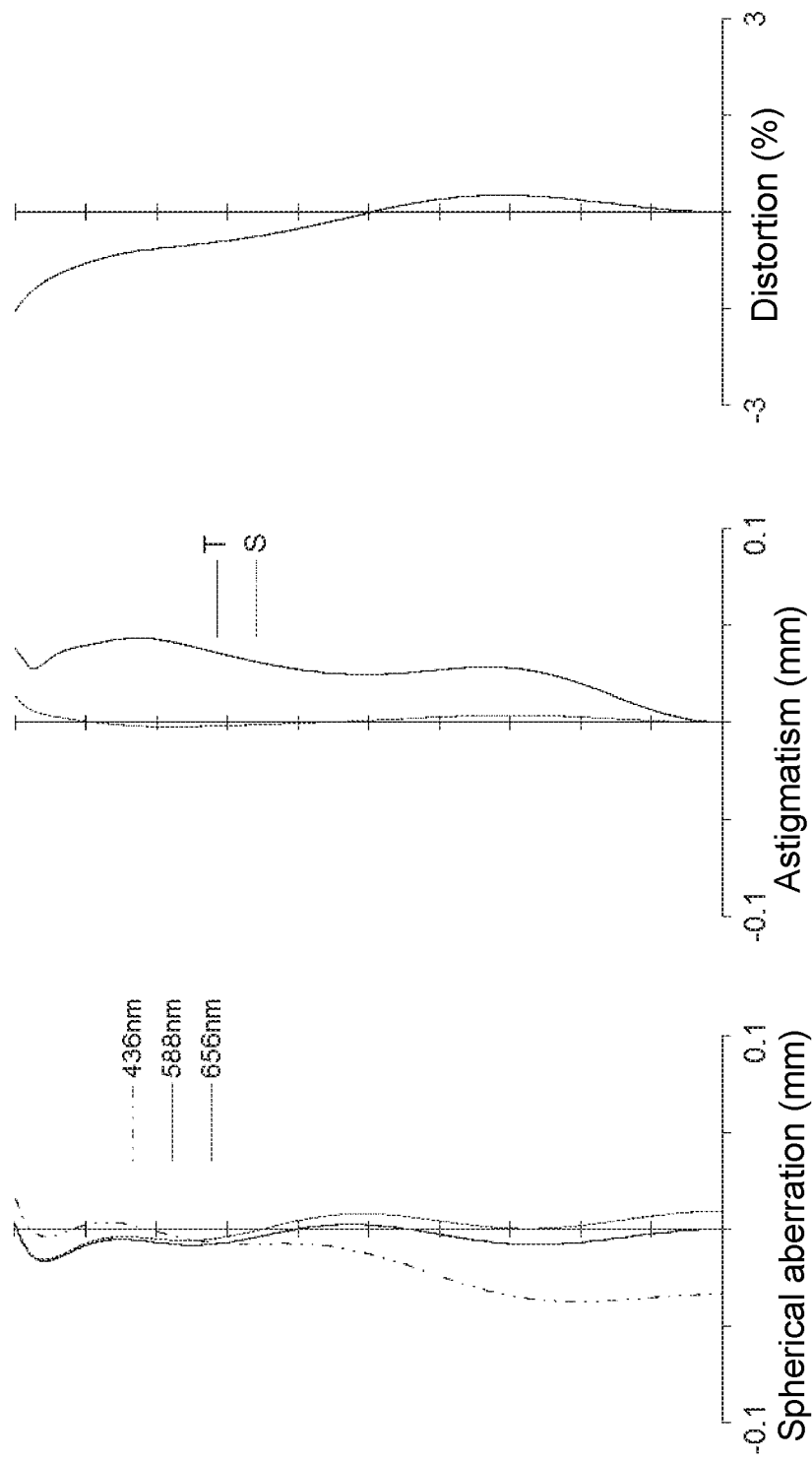
FIG. 18 is an aberration diagram showing a spherical aberration, astigmatism, and a distortion of the imaging lens of FIG. 16.

FIG. 17 shows a lateral aberration that corresponds to the half angle of view ω, and FIG. 18 shows a spherical aberration (mm), astigmatism (mm), and a distortion (%), respectively, for the imaging lens of Numerical Data Example 6. As shown in FIGS. 17 and 18, according to the imaging lens of Numerical Data Example 6, the aberrations are also satisfactorily corrected.

According to the above-described imaging lens of the embodiment, it is achievable to take an image of wide view of angle (2ω), which is as wide as 70° or greater. According to Numerical Data Examples 1 to 6, the imaging lenses have wide angles of view of 74.0°. According to the imaging lens of the embodiment, it is possible to take an image of a wider range than that can be taken by a conventional imaging lens.

Moreover, in these years, with advancement in digital zoom technology, which enables to enlarge any area of an image obtained through an imaging lens by image processing, an imaging element having a high pixel count is often used in combination with a high-resolution imaging lens. In case of such an imaging element with a high pixel count, a light-receiving area of each pixel decreases, so that an image tends to be dark. As a method of correcting the darkness of the image, there is a method of improving light-receiving sensitivity of the imaging element by using an electrical circuit. However, when the light-receiving sensitivity increases, a noise component, which does not directly contribute to formation of an image, is also amplified. Therefore, it is necessary to have another circuit to reduce the noise. According to the imaging lenses of Numerical Data Examples 1 to 6, the Fnos of the imaging lens are as small as 2.2 to 2.3. According to the imaging lens of the embodiment, it is achievable to obtain a sufficiently bright image without providing the above-described electrical circuit.

Accordingly, when the imaging lens of the embodiment is mounted in an imaging optical system, such as cameras built in portable devices including cellular phones, portable information terminals, and smartphones, digital still cameras, security cameras, onboard cameras, and network cameras, it is possible to attain both high performance and downsizing of the cameras.

Accordingly, the present invention may be applicable in an imaging lens to be mounted in relatively small-sized cameras such as cameras that are built in portable devices including cellular phones, smartphones, and portable information terminals, digital still cameras, security cameras, onboard cameras, and network cameras.

The disclosure of Japanese Patent Application No. 2014-083530, filed on Apr. 15, 2014, is incorporated in the application by reference.

While the present invention has been explained with reference to the specific embodiment of the present invention, the explanation is illustrative and the present invention is limited only by the appended claims.

What is claimed is:
1. An imaging lens comprising:
   a first lens group;
   a second lens group; and
   a third lens group, arranged in this order from an object side to an image plane side,
   wherein said first lens group includes a first lens having positive refractive power, a second lens, and a third lens,
   said second lens group includes a fourth lens having negative refractive power and a fifth lens,
   said third lens group includes a sixth lens having negative refractive power and a seventh lens,
   said imaging lens has a total of seven single lenses,
   said first lens, said second lens, said third lens, said fourth lens, said fifth lens, said sixth lens, and said seventh lens are arranged with a space between each of the lenses,
   said second lens is formed in a shape so that a surface thereof on the object side has a positive curvature radius,
   said third lens is formed in a shape so that a surface thereof on the image plane side has a positive curvature radius,
   said fourth lens is formed in a shape so that a surface thereof on the object side has a negative curvature radius,
   said sixth lens is formed in a shape so that a surface thereof on the image plane side has a positive curvature radius, and
   said first lens has an Abbe's number vd1 so that the following conditional expression is satisfied:

$40 < vd1 < 75$.

2. The imaging lens according to claim 1, wherein said seventh lens has an Abbe's number vd7 so that the following conditional expression is satisfied:

$40 < vd7 < 75$.

3. The imaging lens according to claim 1, wherein said first lens has a focal length f1 and said second lens has a focal length f2 so that the following conditional expression is satisfied:

$2.5 < f1/f2 < 30$.

4. The imaging lens according to claim 1, wherein said first lens and said second lens have a composite focal length f12 so that the following conditional expression is satisfied:

$0.5 < f12/f < 1.1$, where f is a focal length of a whole lens system.

5. The imaging lens according to claim 1, wherein said second lens has a focal length f2 and said third lens has a focal length f3 so that the following conditional expression is satisfied:

$-1.0 < f2/f3 < -0.2$.

6. The imaging lens according to claim 1, wherein said first lens and said second lens have a composite focal length f12 and said third lens has a focal length f3 so that the following conditional expression is satisfied:

$-1.0 < f12/f3 < -0.1$.

7. The imaging lens according to claim 1, wherein said sixth lens and said seventh lens have a composite focal length f67 so that the following conditional expression is satisfied:

$-1.5 < f67/f < -0.5$, where f is a focal length of a whole lens system.

8. The imaging lens according to claim 1, wherein said fourth lens and said fifth lens have a composite focal length f45 and said sixth lens and said seventh lens have a composite focal length f67 so that the following conditional expression is satisfied:

$-3 < f45/f67 < -0.8$.

9. The imaging lens according to claim 1, wherein said sixth lens has a focal length f6 and said seventh lens has a focal length f7 so that the following conditional expression is satisfied:

$0.02 < f7/f6 < 0.3$.

10. The imaging lens according to claim 1, wherein said third lens is arranged to be away from the fourth lens by a distance D34 on an optical axis thereof so that the following conditional expression is satisfied:

$0.03 < D34/f < 0.2$ where f is a focal length of a whole lens system.

11. The imaging lens according to claim 1, wherein said seventh lens is formed in a shape so that a surface thereof on the image plane side is aspheric.

12. An imaging lens comprising:
    a first lens group;
    a second lens group; and
    a third lens group, arranged in this order from an object side to an image plane side,
    wherein said first lens group includes a first lens, a second lens, and a third lens,
    said second lens group includes a fourth lens and a fifth lens, said third lens group includes a sixth lens and a seventh lens having negative refractive power, said first lens is formed in a shape so that a surface thereof on the object side and a surface thereof on the image plane side have positive curvature radii, said fifth lens is formed in a shape so that a surface thereof on the image plane side has a positive curvature radius, said seventh lens is formed in a shape so that a surface thereof on the object side has a negative curvature radius, and said third lens is arranged to be away from the fourth lens by a distance D34 on an optical axis thereof so that the following conditional expression is satisfied:

$0.03 < D34/f < 0.2$ where f is a focal length of a whole lens system.

13. The imaging lens according to claim 12, wherein said seventh lens has an Abbe's number vd7 so that the following conditional expression is satisfied:

$40 < vd7 < 75$.

14. The imaging lens according to claim 12, wherein said first lens has a focal length f1 and said second lens has a focal length f2 so that the following conditional expression is satisfied:

$2.5 < f1/f2 < 30$.

15. The imaging lens according to claim 12, wherein said first lens and said second lens have a composite focal length f12 so that the following conditional expression is satisfied:

$0.5 < f12/f < 1.1$.

16. The imaging lens according to claim 12, wherein said second lens has a focal length f2 and said third lens has a focal length f3 so that the following conditional expression is satisfied:

$-1.0 < f2/f3 < -0.2$.

17. The imaging lens according to claim 12, wherein said first lens and said second lens have a composite focal length f12 and said third lens has a focal length f3 so that the following conditional expression is satisfied:

$-1.0 < f12/f3 < -0.1$.

18. The imaging lens according to claim 12, wherein said sixth lens and said seventh lens have a composite focal length f67 so that the following conditional expression is satisfied:

$-1.5 < f67/f < -0.5$.

19. The imaging lens according to claim 12, wherein said fourth lens and said fifth lens have a composite focal length f45 and said sixth lens and said seventh lens have a composite focal length f67 so that the following conditional expression is satisfied:

$-3 < f45/f67 < -0.8$.

20. The imaging lens according to claim 12, wherein said sixth lens has a focal length f6 and said seventh lens has a focal length f7 so that the following conditional expression is satisfied:

$0.02 < f7/f6 < 0.3$.

* * * * *